US012687976B2

(12) United States Patent
Watanabe et al.

(10) Patent No.: US 12,687,976 B2
(45) Date of Patent: Jul. 21, 2026

(54) MEMORY DEVICE

(71) Applicant: TAIWAN SEMICONDUCTOR MANUFACTURING COMPANY, LTD., Hsinchu (TW)

(72) Inventors: Ryota Watanabe, Yokohama (JP); Hidemitsu Kojima, Yokohama (JP)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/778,344

(22) Filed: Jul. 19, 2024

(65) Prior Publication Data

US 2026/0023494 A1     Jan. 22, 2026

(51) Int. Cl.
*G06F 3/06*          (2006.01)

(52) U.S. Cl.
CPC .......... *G06F 3/0638* (2013.01); *G06F 3/0608* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211;

G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692;

(Continued)

(56) References Cited

U.S. PATENT DOCUMENTS

| | | | |
|---|---|---|---|
| 7,952,939 B2 * | 5/2011 | Chen | G11C 11/413 365/189.09 |
| 8,009,459 B2 * | 8/2011 | Wu | G11C 11/416 365/145 |

(Continued)

OTHER PUBLICATIONS

S. Lichtensteiger and J. Bickford, "Using selective voltage binning to maximize yield," 2012 SEMI Advanced Semiconductor Manufacturing Conference, Saratoga Springs, NY, USA, 2012, pp. 7-10, doi: 10.1109/ASMC.2012.6212859. (Year: 2012).*

*Primary Examiner* — Daniel C. Chappell
(74) *Attorney, Agent, or Firm* — Birch, Stewart, Kolasch & Birch, LLP

(57) ABSTRACT

A memory device includes a first memory column, a memory array and a sign decoder. The first memory column is configured to store first sign bits. The memory array is configured to store a first data array and generate bit line signals. The sign decoder is configured to output data signals according to the first sign bits and the bit line signals. The data signals correspond to a second data array, and the first data array is generated by reversing rows of the second data array according to the first sign bits.

20 Claims, 17 Drawing Sheets

400A

Generating a minimum difference Δnmin(N, M) according to a row quantity N of a first data array D1 and a column quantity M of the first data array D1 — OPA41

Formulating the first data array D1 into a matrix DM1 — OPA42

Updating a first vector SV1 according to the matrix DM1 and the minimum difference Δnmin(N, M) until the first vector SV1 conforms the minimum difference Δnmin(N, M) — OPA43

Generating a plurality of sign bits SB1 according to the first vector SV1 — OPA44

Reversing rows of the first data array D1 according to the plurality of sign bits SB1 to generate a second data array D2 — OPA45

(58) Field of Classification Search
CPC ...... G11C 13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

2015/0079700 A1*  3/2015  Ke ........................... H01L 22/20
                                                                    438/5
2023/0009027 A1*  1/2023  Chen .............. H03K 19/017509

* cited by examiner

MEMORY DEVICE

BACKGROUND

In a memory device, a keeper circuit is coupled with each bit line to hold high bit line level against bit line leakage current in high level sensing. However, excessive keeper current degrades access time and low level read margin.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
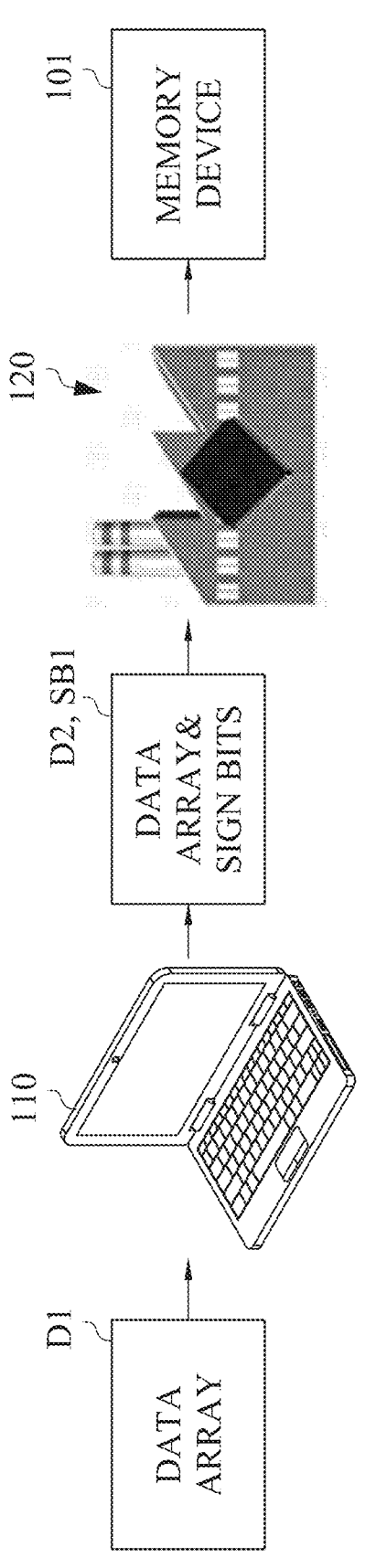
FIG. 1 is a schematic diagram of a system illustrated in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. As used herein, "around," "about," "approximately," or "substantially" may generally mean within 20 percent, or within 10 percent, or within 5 percent of a given value or range. Numerical quantities given herein are approximate, meaning that the term "around," "about," "approximately," or "substantially" can be inferred if not expressly stated. One skilled in the art will realize, however, that the values or ranges recited throughout the description are merely examples, and may be reduced or varied with the downscaling of the integrated circuits.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

FIG. 1 is a schematic diagram of a system 100 illustrated in accordance with some embodiments of the present disclosure. In some embodiments, the system 100 is configured to manufacture a semiconductor product, such as a memory device 101. In some embodiments, the memory device 101 is implemented by a read only memory (ROM).

As illustratively shown in FIG. 1, the system 100 includes a processor 110 and a manufacturing device 120. The processor 110 is configured to receive a data array D1, and generate sign bits SB1 and another data array D2 according to the data array D1.

The manufacturing device 120 is configured to manufacture the memory device 101 according to the data array D2 and the sign bits SB1. The memory device 101 is configured to store the data array D2 and the sign bits SB1. When the read operation is performed, the memory device 101 is configured to output the data array D1 according to the data array D2 and the sign bits SB1.

Figure 2A:
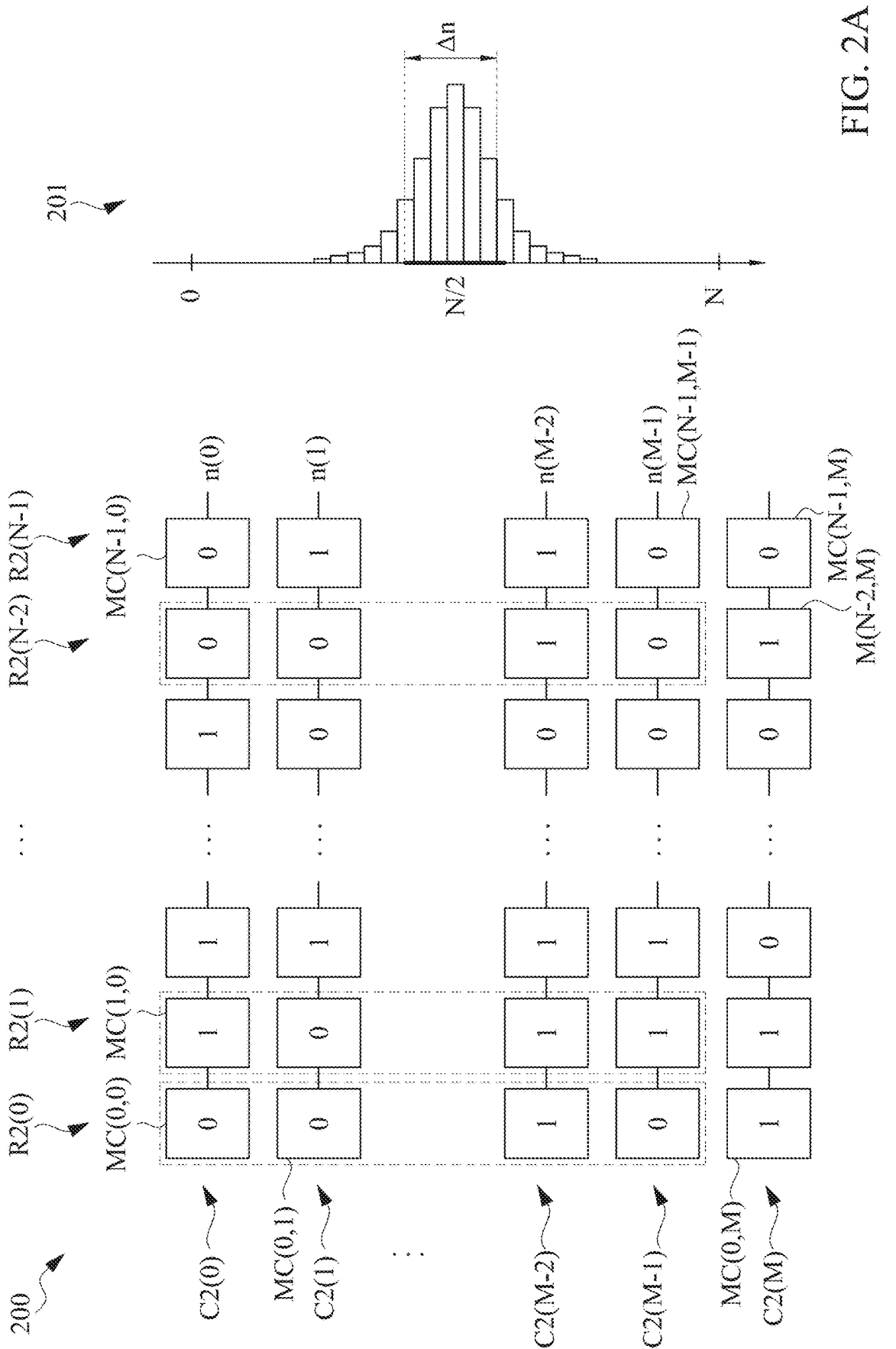
FIG. 2A is a schematic diagram of a memory array illustrated in accordance with some embodiments of the present disclosure.

FIG. 2A is a schematic diagram of a memory array 200 illustrated in accordance with some embodiments of the present disclosure. As illustratively shown in FIG. 2A, the memory array 200 includes multiple memory cells MC(0, 0)-MC(N-1, M) arranged in rows R2(0)-R2(N-1) and columns C2(0)-C2(M), in which N and M in the parenthesis are positive integers.

Specifically, the row R2(0) includes memory cells MC(0, 0)-MC(0, M). The row R2(1) includes memory cells MC(1, 0)-MC(1, M), and so on. The row R2(N-1) includes memory cells MC(N-1, 0)-MC(N-1, M). Similarly, the column C2(0) includes memory cells MC(0, 0)-MC(N-1, 0). The column C2(1) includes memory cells MC(0, 1)-MC(N-1, 1), and so on. The column C2(M) includes memory cells MC(0, M)-MC(N-1, M).

Referring to FIG. 1 and FIG. 2A, in some embodiments, the memory array 200 is included in the memory device 101, and configured to store the data array D2 and the sign bits SB1. The data array D2 includes data bits D2(0, 0)-D2(N-1, M-1). The memory cells MC(0, 0)-MC(N-1, M-1) are configured to store the data bits D2(0, 0)-D2(N-1, M-1), respectively. The sign bits SB1 includes sign bits SB1(0)-SB(N-1). The memory cells MC(0, M)-MC(N-1, M) are configured to store the sign bits SB1(0)-SB(N-1), respectively.

In some embodiments, the sign bits SB1 indicates data bits in some rows of the data array D1 is reversed to generates the data bits in corresponding rows of the data array D2. The memory array D1 includes data bits D1(0, 0)-D1(N-1, M-1), which correspond to the data bits D2(0, 0)-D2(N-1, M-1), respectively. When a data bit is reversed, a logic value 0 of the data bit is changed to a logic value 1, and the logic value 1 of the data bit is changed to the logic value 0.

For example, in the embodiment shown in FIG. 2A, the sign bits SB1(0), SB1(1) and SB1(N-2) have the logic value 1, which indicates that data bits in the rows R2(0), R2(1) and R2(N-2) are reversed from the corresponding data bits of the memory array D1.

Specifically, the data bits D2(0, 0), D2(0, 1), D2(0, M-2) and D2(0, M-1) respectively having logic values 0, 0, 1 and 0 indicates the data bits D1(0, 0), D1(0, 1), D1(0, M-2) and D1(0, M-1) respectively having logic values 1, 1, 0 and 1. The data bits D2(1, 0), D2(1, 1), D2(1, M-2) and D2(1, M-1) respectively having logic values 1, 0, 1 and 1 indicates the data bits D1(1, 0), D1(1, 1), D1(1, M-2) and D1(1, M-1) respectively having logic values 0, 1, 0 and 0. The data bits D2(N-2, 0), D2(N-2, 1), D2(N-2, M-2) and D2(N-2, M-1) respectively having logic values 0, 0, 1 and 0 indicates the data bits D1(N-2, 0), D1(N-2, 1), D1(N-2, M-2) and D1(N-2, M-1) respectively having logic values 1, 1, 0 and 1.

On the other hand, the sign bits SB1(2), SB1(N-3) and SB1(N-1) have the logic value 0, which indicates that data bits in the rows R2(2), R2(N-3) and R2(N-1) are not reversed from the corresponding data bits of the memory array D1. Alternatively stated, the logic values of the data bits D2(2, 0)-D2(2, M-1), D2(N-3, 0)-D2(N-3, M-1) and D2(N-1, 0)-D2(N-1, M-1) are same as the logic values of the data bits D1(2, 0)-D1(2, M-1), D1(N-3, 0)-D1(N-3, M-1) and D1(N-1, 0)-D1(N-1, M-1).

In some embodiments, a data bit having the logic value 1 is referred to as an on-bit. A memory cell store an on-bit is referred to as an on-bit cell. The column C2(0) includes an on-bit number n(0) of on-bit cells. The column C2(1) includes an on-bit number n(1) of on-bit cells, and so on. The column C2(M-1) includes an on-bit number n(M-1) of on-bit cells. In general, for an integer m between 0 and M-1, the on-bit number n(m) is the number of on-bit cell of the column C2(m).

By formulating proper sign bits SB1, a difference number $\Delta n$ of the data array D2 is limited for arbitrary data array D1. The difference number $\Delta n$ is defined by a difference between a maximum MAXn and a minimum MINn. The maximum MAXn is the largest one among the on-bit numbers n(0)-n (M-1), and the minimum MINn is the smallest one among the on-bit numbers n(0)-n(M-1). Details of determining the sign bits SB1 are described below with embodiments associated with FIG. 4A to FIG. 6.

As illustratively shown in FIG. 2A, FIG. 2A further includes a distribution diagram 201. The distribution diagram 201 corresponds to a distribution of the on-bit numbers n(0)-n(M-1) for the data array D1. A vertical axis of the distribution diagram 201 corresponds to values of the on-bit numbers n(0)-n(M-1). A horizontal axis of the distribution diagram 201 corresponds to quantities of the on-bit numbers n(0)-n(M-1) having the certain values.

In some approaches, rows in a memory array are not processed according to sign bits. Accordingly, a corresponding difference number $\Delta n$ of the memory array is large, such that a keeper current is hard to designed for various columns with high on-bit ratio and low on-bit ratio, which corresponding to different bit-line leakage current.

Compared to above approaches, some rows (for example, the rows R2(0), R2(1) and R2(N-2)) in the memory array 200 are flipped according to the sign bits SB1. The sign bits SB1 are properly formulated to reduce the difference number $\Delta n$, such that a distribution of bit-line leakage current of the columns C2(0)-C2(M-1) are narrower. Accordingly, the access time and high/low-level read margins are improved. The stored data dependence for specification is soften, which made verification process much easier.

Figure 2B:
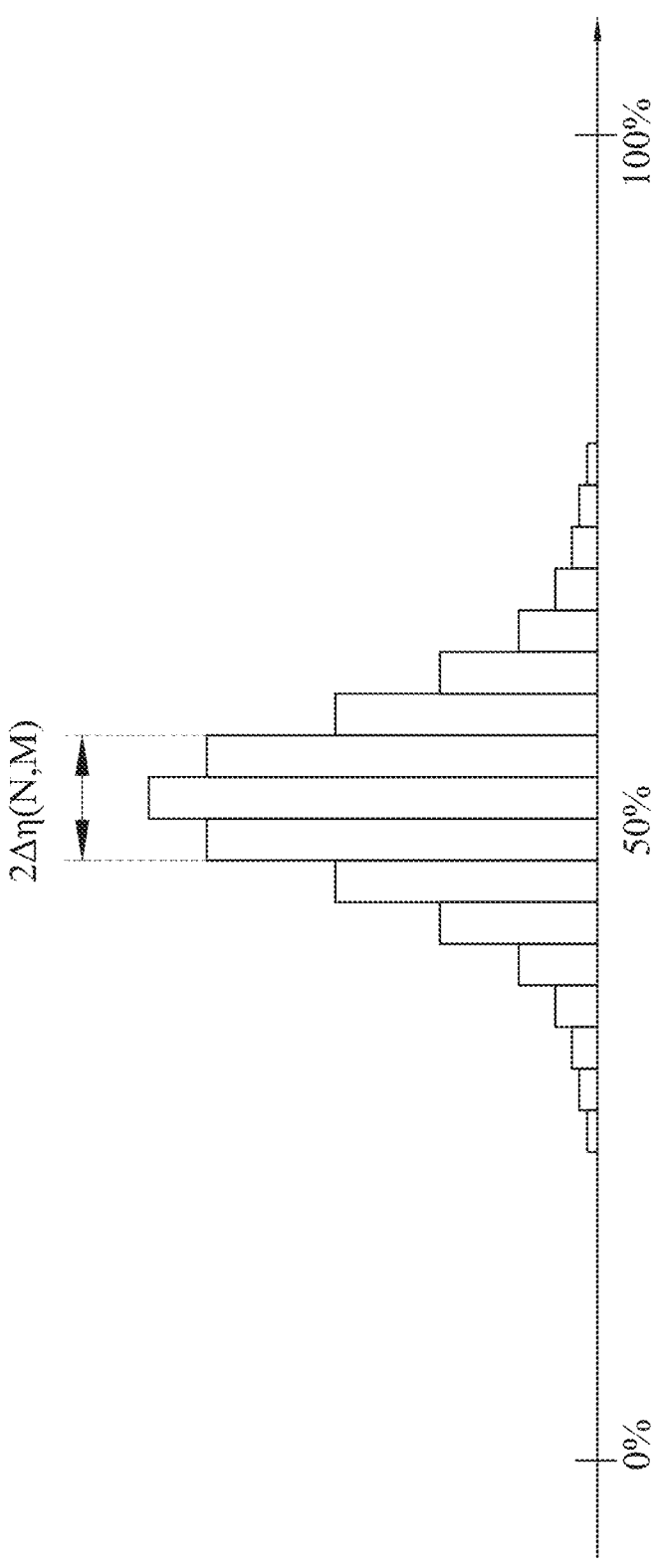
FIG. 2B is a distribution diagram of an on-bit ratio for a column in accordance with some embodiments of the present disclosure.

FIG. 2B is a distribution diagram of on-bit ratios $\eta$ in accordance with some embodiments of the present disclosure. In some embodiments, the on-bit ratios η includes on-bit ratios η(0)-η(M-1). The on-bit ratios η(0)-η(M-1) are defined by n(0)/N-n(M-1)/N, respectively. A width $\Delta\eta(N, M)$ of the on-bit ratios η can be calculated by equations (1) and (2) as following, in which $$\Phi_N^{-1}$$

is an inverse function of the binomial distribution function $\Phi_N$. It is noted that the equations (1) and (2) are examples. In various embodiments, a larger value of $\Delta\eta(N, M)$ can be used instead of the equation (1).

$$\Delta\eta(N, M) = \frac{1}{2} - \left[\Phi_N^{-1}\left(\frac{1}{2M}\right)\right]. \qquad \text{equation (1)}$$

$$\Phi_N(n) \equiv \sum_{m=0}^{n} \frac{1}{2^N}\binom{N}{m}. \qquad \text{equation (2)}$$

With coding, the distribution of on-bit ratios η of the data array D2 is within a range of $50\%\pm\Delta\eta(N, M)$ for arbitrary data array D1. For example, for each of M and N being equal to 8192, the distribution of on-bit ratios η of the arbitrary data array D1 is within a range of 0%-100%, and the distribution of on-bit ratios η of the arbitrary data array D2 is within a range of 47.9%-52.1%, in which $\Delta\eta(8192, 8192)$ is equal to 2.1%.

Figure 3A:
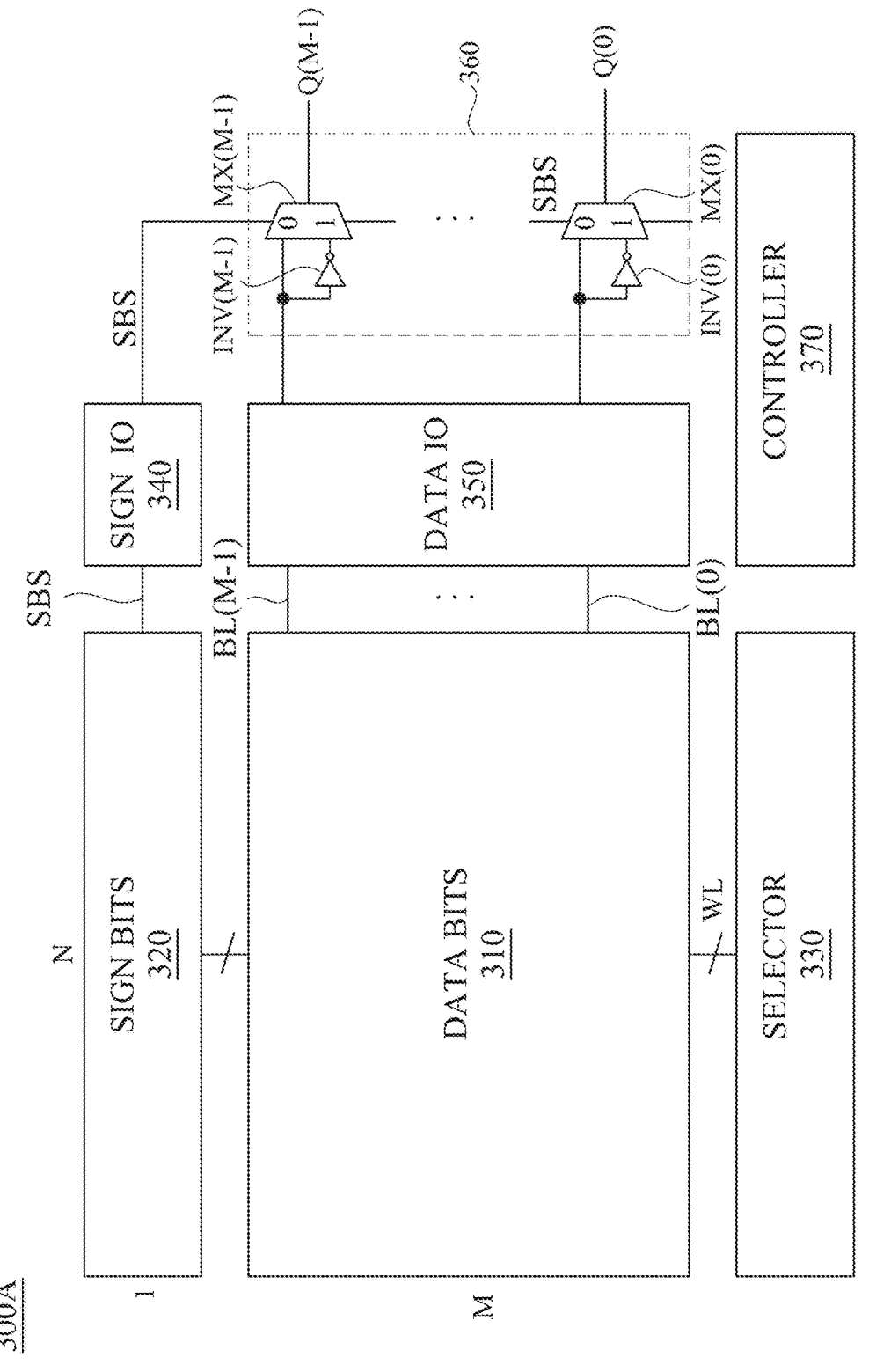
FIG. 3A is a schematic diagram of a memory device corresponding to the memory device shown in FIG. 1, illustrated in accordance with some embodiments of the present disclosure.

FIG. 3A is a schematic diagram of a memory device 300A corresponding to the memory device 101 shown in FIG. 1, illustrated in accordance with some embodiments of the present disclosure. As illustratively shown in FIG. 3A, the memory device 300A includes a memory array 310, a memory column 320, a word line selector 330, a sign input/output circuit 340, a data input/output circuit 350, a sign decoder 360 and a controller 370. The memory array 310 includes M columns and N rows, and the memory column 320 includes 1 column and N rows.

In some embodiments, the memory array 310 is config-ured to store the data array D2. The memory column 320 is configured to store the sign bits SB1. Referring to FIG. 2A and FIG. 3A, in some embodiments, the memory columns C2(0)-C2(M-1) are included in the memory array 310, and the memory column C2(M) is included in the memory column 320.

In some embodiments, the word line selector 330 is configured to generate word line signals WL to the memory array 310 and the memory column 320. In response to the word line signals WL, the memory array 310 generates bit line signals BL(0)-BL(M-1), and the memory column 320 generates a sign bit signal SBS.

In some embodiments, the controller 370 is configured to control the sign input/output circuit 340 and the data input/output circuit 350. The sign input/output circuit 340 is configured to access and transmit the sign bit signal SBS to the sign decoder 360. The data input/output circuit 350 is configured to access and transmit the bit line signals BL(0)-BL(M-1) to the sign decoder 360. The sign decoder 360 is configured to generate data signals Q(0)-Q(M-1).

As illustratively shown in FIG. 3A, the sign decoder 360 includes multiplexers MX(0)-MX(M-1) and inverters INV (0)-INV(M-1). The inverters INV(0)-INV(M-1) are config-ured to invert the bit line signals BL(0)-BL(M-1), respec-tively. Control terminals of multiplexers MX(0)-MX(M-1) are configured to receive the sign bit signal SBS. First input terminals of the multiplexers MX(0)-MX(M-1) are config-ured to receive the bit line signals BL(0)-BL(M-1), respec-tively. Second input terminals of the multiplexers MX(0)-MX(M-1) are configured to receive inverted bit line signals corresponding to the bit line signals BL(0)-BL(M-1), respectively. The first input terminals of the multiplexers MX(0)-MX(M-1) correspond to the logic value 0 of the sign bit signal SBS, and the second input terminals of the multiplexers MX(0)-MX(M-1) correspond to the logic value 1 of the sign bit signal SBS.

During read operation, the bit line signals BL(0)-BL(M-1) carry the data bits of the data array D2, and the sign decoder 360 is configured to generate the data signals Q(0)-Q(M-1) carrying the data bits of the data array D1 according to the sign bits SB1.

For example, when the row R2(0) is read, the bit line signal BL(0) has the logic value 0 of the data bit D2(0, 0), the bit line signal BL(M-1) has the logic value 0 of the data bit D2(0, M-1), and the sign bit signal SBS has the logic value 1 of the sign bit SB1(0). Accordingly, the multiplexer MX(0) outputs the inverted bit line signal generated by the inverter INV(0) as the data signal Q(0), and the multiplexer MX(M-1) outputs the inverted bit line signal generated by the inverter INV(M-1) as the data signal Q(M-1). At this moment, the data signal Q(0) has the logic value 1 of the data bit D1(0, 0), and the data signal Q(M-1) has the logic value 1 of the data bit D1(0, M-1).

For another example, when the row R2(N-1) is read, the bit line signal BL(0) has the logic value 0 of the data bit D2(N-1, 0), the bit line signal BL(M-1) has the logic value 0 of the data bit D2(N-1, M-1), and the sign bit signal SBS has the logic value 0 of the sign bit SB1(N-1). Accordingly, the multiplexer MX(0) outputs the bit line signal BL(0) as the data signal Q(0), and the multiplexer MX(M-1) outputs the bit line signal BL(M-1) as the data signal Q(M-1). At this moment, the data signal Q(0) has the logic value 0 of the data bit D1(N-1, 0), and the data signal Q(M-1) has the logic value 0 of the data bit D1(N-1, M-1).

In the embodiment shown in FIG. 3A, the on-bit ratios η of the memory array 310 is within a range of $50\%\pm\Delta\eta(N, M)$.

Figure 3B:
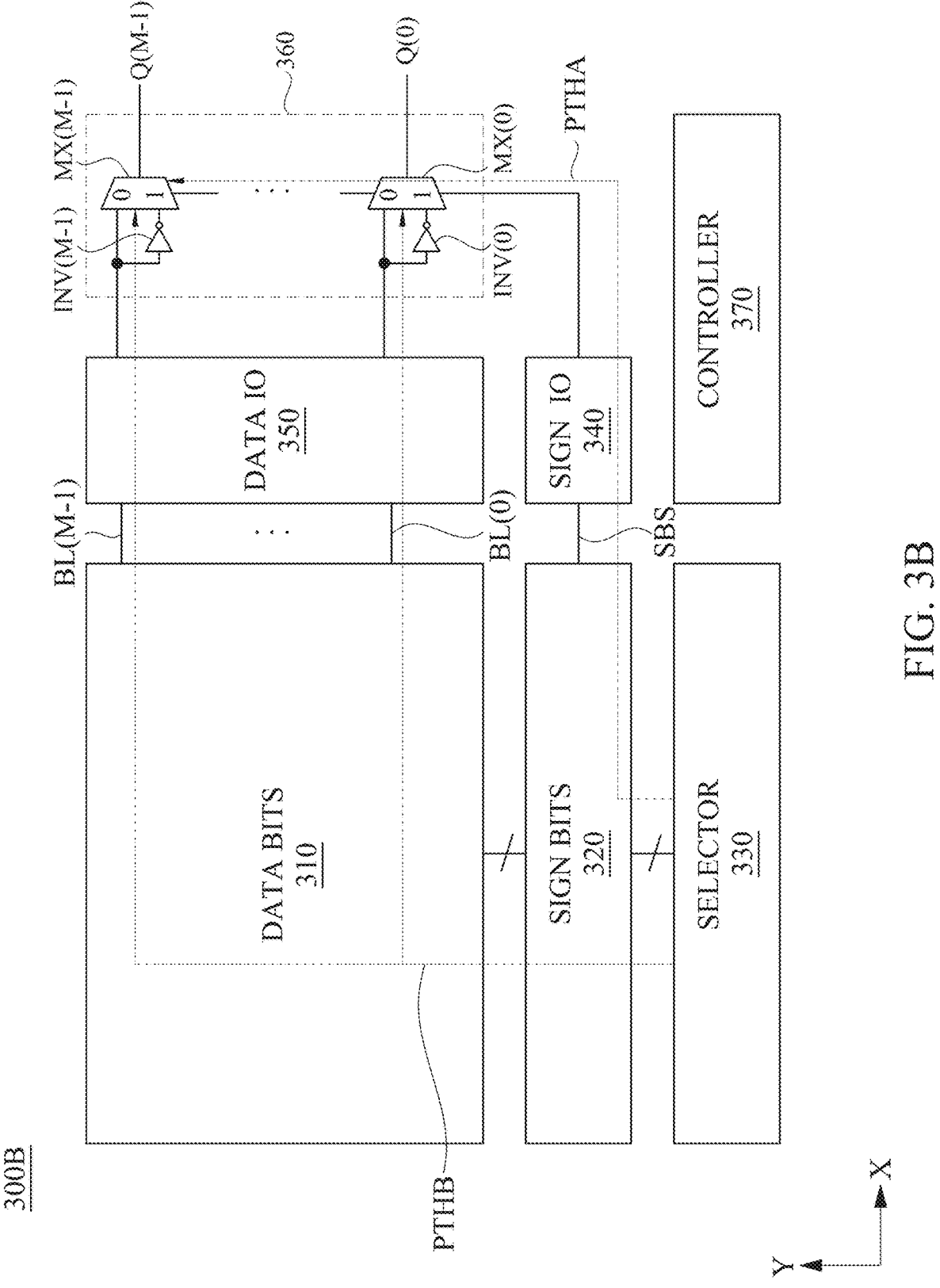
FIG. 3B is a schematic diagram of an example for preferred physical arrangement of the memory device shown in FIG. 3A, illustrated in accordance with some embodiments of the present disclosure.

FIG. 3B is a schematic diagram of an example of pre-ferred physical arrangement of a memory device 300B corresponding to the memory device 300A shown in FIG. 3A, illustrated in accordance with some embodiments of the present disclosure. As illustratively shown in FIG. 3B, the data input/output circuit 350 is arranged between the memory array 310 and the sign decoder 360 along an X direction. The memory column 320 is arranged between the memory array 310 and the word line selector 330 along a Y direction. The sign input/output circuit 340 is arranged between the data input/output circuit 350 and the controller 370 along the Y direction.

As illustratively shown in FIG. 3B, the memory device 300B includes electrical paths PTHA and PTHB. The elec-trical path PTHB corresponds to the bit line signals BL(0)-BL(M-1), and the electrical path PTHA corresponds to the sign bit signal SBS. With the arrangement shown in FIG. 3B, the sign bit signal SBS through the electrical path PTHA arrives the sign decoder 360 earlier than the bit line signals BL(0)-BL(M-1) through the electrical path PTHB. Accord-ingly, the multiplexers MX(0)-MX(M-1) are selected by the sign bit signal SBS before the bit-line signals arrives, to output the data signals Q(0)-Q(M-1).

Figure 3C:
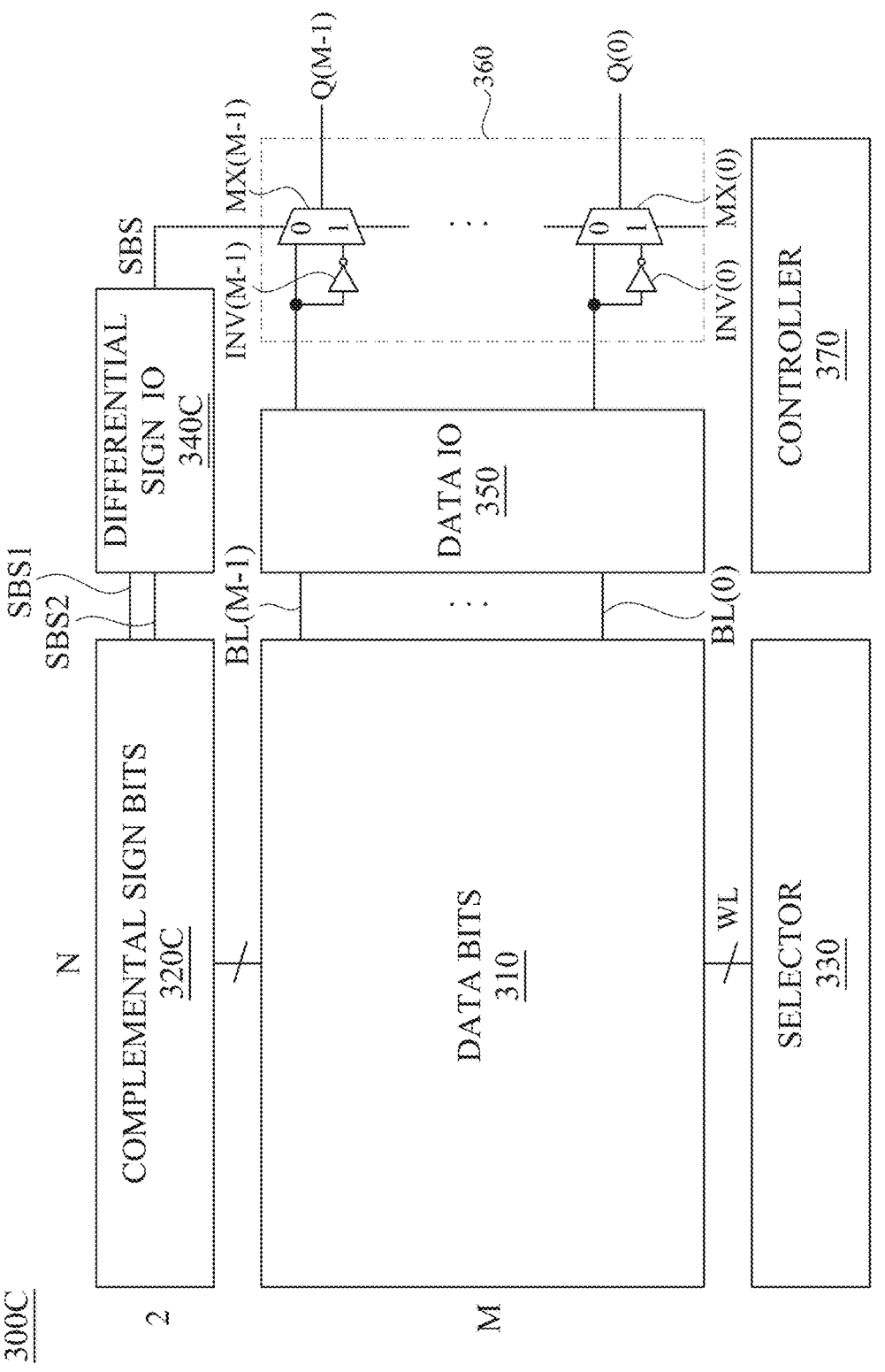
FIG. 3C is a schematic diagram of a memory device corresponding to the memory device shown in FIG. 3A, illustrated in accordance with some embodiments of the present disclosure.

FIG. 3C is a schematic diagram of a memory device 300C corresponding to the memory device 300A shown in FIG. 3A, illustrated in accordance with some embodiments of the present disclosure. Referring to FIGS. 3A and 3C, the memory device 300C is an alternative embodiment of the memory device 300A. FIG. 3C follows a similar labeling convention to that of FIG. 3A. For brevity, the discussion will focus more on differences between FIG. 3C and FIG. 3A than on similarities.

Compared to memory device 300A, the memory device 300C includes a memory array 320C and a differential sign input/output circuit 340C instead of the memory column 320 and the sign input/output circuit 340. Operations of the memory array 320C and the differential sign input/output circuit 340C are similar with the memory column 320 and the sign input/output circuit 340. Therefore, some descriptions are not repeated for brevity.

In some embodiments, the memory array 320C is configured to store the sign bits SB1 and complemental sign bits SB1C. The complemental sign bits SB1C and the sign bits SB1 are complementary with each other. When one of the sign bits SB1 has the logic value 0, a corresponding one of the complemental sign bits SB1C has the logic value 1. When one of the sign bits SB1 has the logic value 1, a corresponding one of the complemental sign bits SB1C has the logic value 0.

In some embodiments, the memory array 320C includes two columns and N rows. One of the two columns is configured to store the sign bits SB1, such as the memory column 320. Another one of the two columns is configured to store the complemental sign bits SB1C. The memory array 320C is further configured to generate the sign bit signal SBS1 which carries the sign bits SB1 and a complemental sign bit signal SBS2 which carries the complemental sign bits SB1C.

In some embodiments, the differential sign input/output circuit 340C is comprised of, for example, a differential amplifier which amplifies differential voltage between the sign bit signal SBS1 and the complemental sign bit signal SBS2, to generate the sign bit signal SBS. Accordingly, an acquisition time of the sign bit signal SBS decreases.

In the embodiment shown in FIG. 3C, the on-bit ratios $\eta$ of the memory array 310 is within a range of 50%$\pm\Delta\eta$(N, M).

Figure 3D:
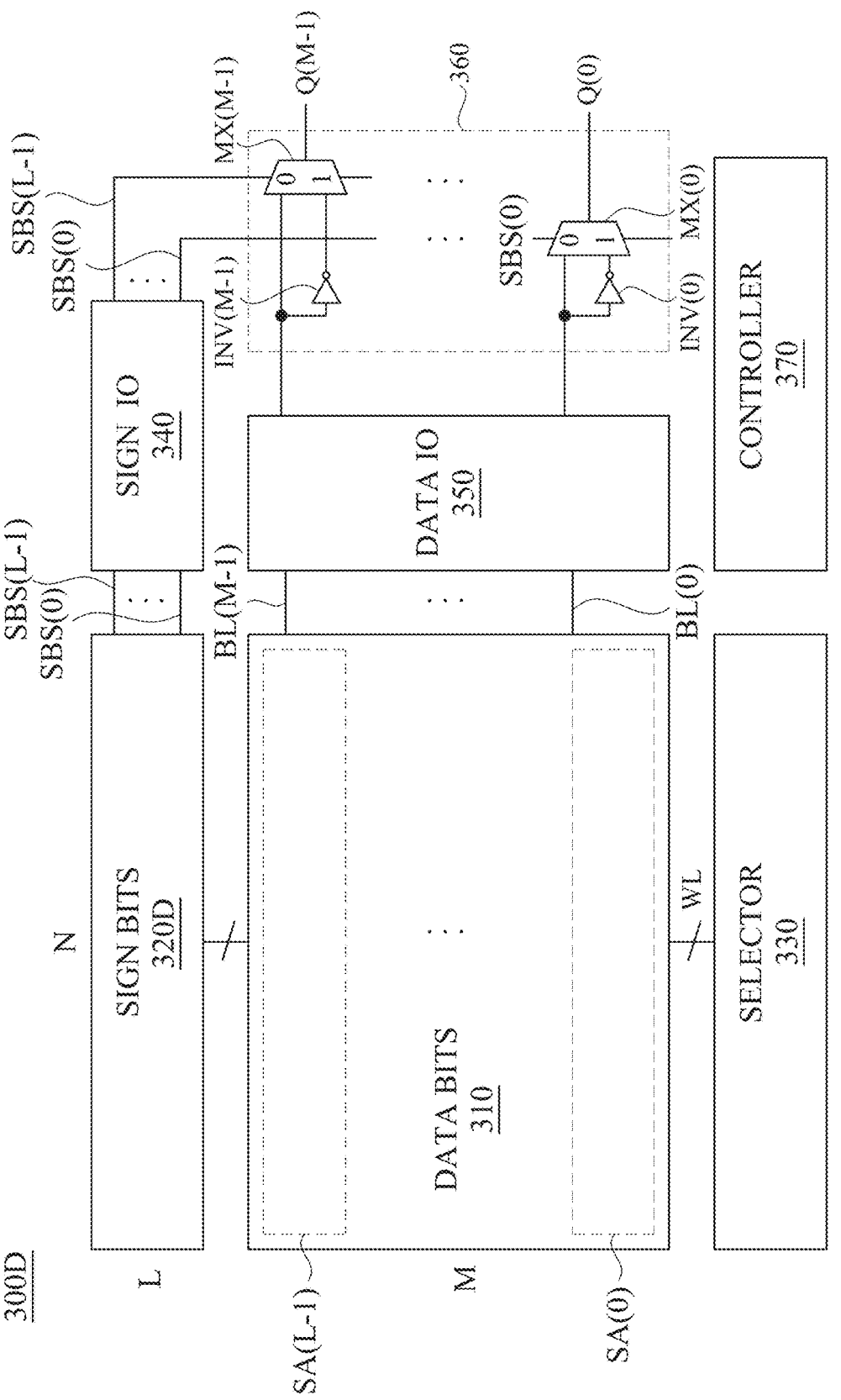
FIG. 3D is a schematic diagram of a memory device corresponding to the memory device shown in FIG. 3A, illustrated in accordance with some embodiments of the present disclosure.

FIG. 3D is a schematic diagram of a memory device 300C corresponding to the memory device 300A shown in FIG. 3A, illustrated in accordance with some embodiments of the present disclosure. Referring to FIG. 3A and FIG. 3D, the memory device 300D is an alternative embodiment of the memory device 300A. FIG. 3D follows a similar labeling convention to that of FIG. 3A. For brevity, the discussion will focus more on differences between FIG. 3D and FIG. 3A than on similarities.

Compared to memory device 300A, the memory device 300D includes a memory array 320D instead of the memory column 320. The memory array 320D includes L columns RD(0)-RD(L-1) and N rows, in which L is a positive integer smaller than M. The columns RD(0)-RD(L-1) are configured to store sign bits SBD(0)-SBD(L-1), respectively.

On the other hand, the memory array 310 is separated into L sub-arrays SA(0)-SA(L-1). Each of the sub-arrays SA(0)-SA(L-1) includes N rows. The sub-array SA(0) includes m(0) columns. The sub-array SA(1) includes m(1) columns, and so on. The sub-array SA(L-1) includes m(L-1) columns. It is noted that the numbers m(0)-m(L-1) are positive integers. The sign bits SBD(0)-SBD(L-1) correspond to the sub-arrays SA(0)-SA(L-1), respectively. Each of relationships between the sign bits SBD(0)-SBD(L-1) and the sub-arrays SA(0)-SA(L-1) are similar with the relationships between the sign bits SB1 and the memory array 310 shown in FIG. 3A.

Specifically, data bits in some rows of the sub-array SA(0) are reversed in response to the logic value 1 in the sign bits SBD(0), and data bits in other rows of the sub-array SA(0) are not reversed in response to the logic value 0 in the sign bits SBD(0). Data bits in some rows of the sub-array SA(1) are reversed in response to the logic value 1 in the sign bits SBD(1), and data bits in other rows of the sub-array SA(1) are not reversed in response to the logic value 0 in the sign bits SBD(1), and so on. Data bits in some rows of the sub-array SA(L-1) are reversed in response to the logic value 1 in the sign bits SBD(L-1), and data bits in other rows of the sub-array SA(L-1) are not reversed in response to the logic value 0 in the sign bits SBD(L-1).

In the embodiment shown in FIG. 3D, the memory array 320D is configured to generate sign bit signals SBS(0)-SBS(L-1) which correspond to the sign bits SBD(0)-SBD(L-1), respectively. The sign input/output circuit 340 is configured to transmit the sign bit signals SBS(0)-SBS(L-1) to the sign decoder 360.

In the embodiment shown in FIG. 3D, the multiplexers MX(0)-MX(M-1) are separated into L multiplexer groups. The first multiplexer group includes m(0) multiplexers. The second multiplexer group includes m(1) multiplexers, and so on. The Lth multiplexer group includes m(L-1) multiplexers. Each of control terminals of the first multiplexer group is configured to receive the sign bit signal SBS(0). Each of control terminals of the second multiplexer group is configured to receive the sign bit signal SBS(1), and so on. Each of control terminals of the Lth multiplexer group is configured to receive the sign bit signal SBS(L-1). As illustratively shown in FIG. 3D, the multiplexer MX(0) is included in the first multiplexer group, and the multiplexer MX(M) is included in the Lth multiplexer group.

Furthermore, the first multiplexer group is configured to receive the bit line signals from the sub-array SA(0), and reverse the bit line signals according to the sign bit signal SBS(0) to generate corresponding ones of the data signals Q(0)-Q(M-1). The second multiplexer group is configured to receive the bit line signals form the sub-array SA(1), and reverse the bit line signals according to the sign bit signal SBS(1) to generate corresponding ones of the data signals Q(0)-Q(M-1), and so on. The Lth multiplexer group is configured to receive the bit line signals form the sub-array SA(L-1), and reverse the bit line signals according to the sign bit signal SBS(L-1) to generate corresponding ones of the data signals Q(0)-Q(M-1).

In the embodiment shown in FIG. 3D, the on-bit ratios $\eta$ of the memory array 310 is within a range of 50%$\pm\Delta\eta$(N, maxm), in which the maximum maxm is the largest number among the numbers m(0)-m(L-1). It is noted that $\Delta\eta$(N, maxm) is smaller than $\Delta\eta$(N, M).

Figure 3E:
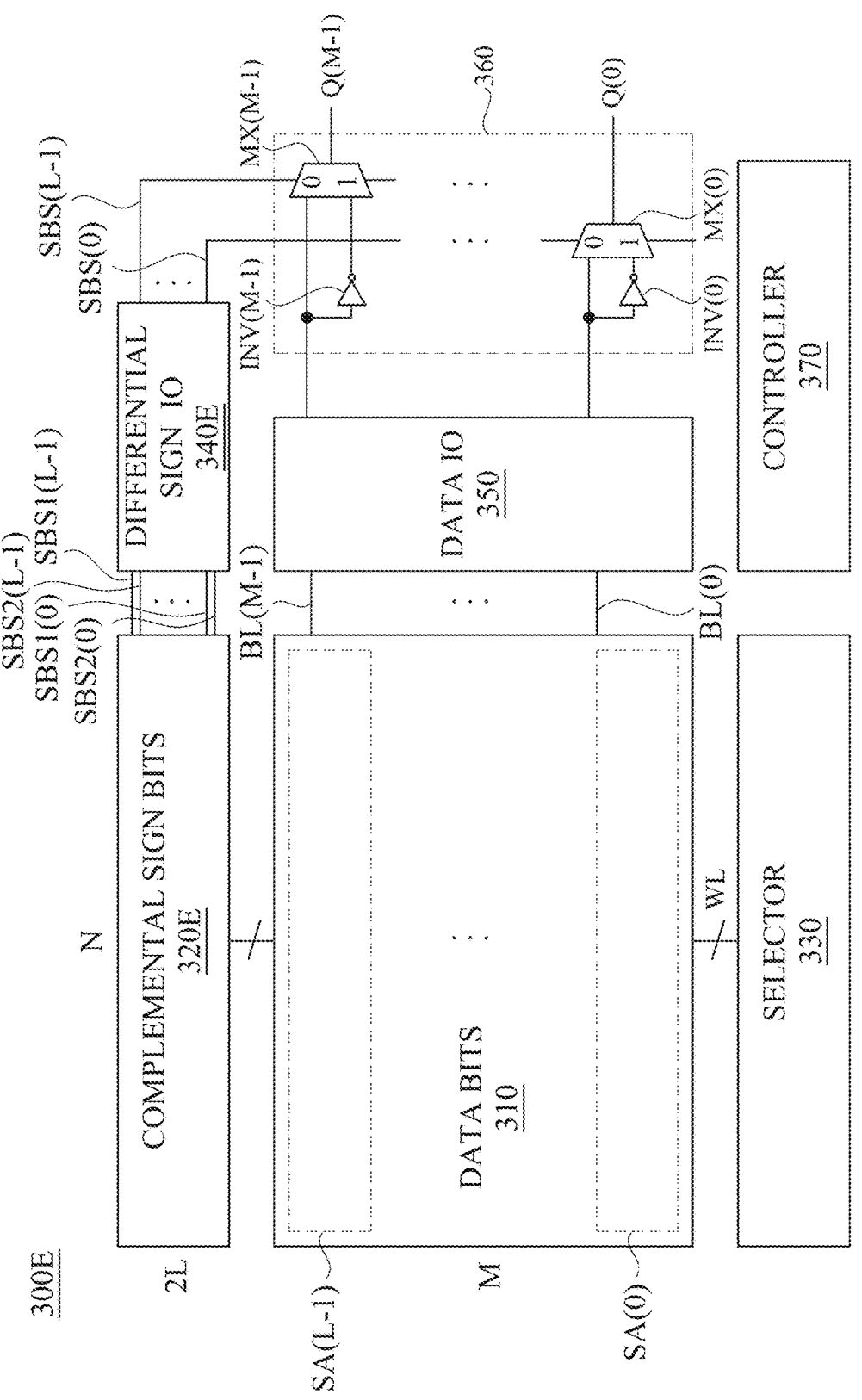
FIG. 3E is a schematic diagram of a memory device corresponding to the memory device shown in FIG. 3D, illustrated in accordance with some embodiments of the present disclosure.

FIG. 3E is a schematic diagram of a memory device 300E corresponding to the memory device 300D shown in FIG. 3D, illustrated in accordance with some embodiments of the present disclosure. Referring to FIG. 3E and FIG. 3D, the memory device 300E is an alternative embodiment of the memory device 300D. FIG. 3E follows a similar labeling convention to that of FIG. 3D. For brevity, the discussion will focus more on differences between FIG. 3D and FIG. 3E than on similarities.

Compared to memory device 300D, the memory device 300E includes a memory array 320E and a differential sign input/output circuit 340E instead of the memory array 320D and the sign input/output circuit 340. Operations of the memory array 320E and the differential sign input/output circuit 340E are similar with the memory column 320D and the sign input/output circuit 340. Therefore, some descriptions are not repeated for brevity.

In some embodiments, the memory array 320D includes 2L columns RD(0)-RD(L-1), RDE(0)-RDE(L-1) and N rows. The columns RD(0)-RD(L-1) are configured to store the sign bits SBD(0)-SBD(L-1), respectively. The columns RDE(0)-RDE(L-1) are configured to store the complemental sign bits SBDE(0)-SBDE(L-1), respectively.

In some embodiments, the complemental sign bits SBDE (0)-SBDE(L-1) are complementary with the sign bits SBD (0)-SBD(L-1), respectively. When one of the sign bits SBD (0) has the logic value 0, a corresponding one of the complemental sign bits SBDE(0) has the logic value 1. When one of the sign bits SBD(0) has the logic value 1, a corresponding one of the complemental sign bits SBDE(0) has the logic value 0. When one of the sign bits SBD(1) has the logic value 0, a corresponding one of the complemental sign bits SBDE(1) has the logic value 1. When one of the sign bits SBD(1) has the logic value 1, a corresponding one of the complemental sign bits SBDE(1) has the logic value 0, and so on. When one of the sign bits SBD(L-1) has the logic value 0, a corresponding one of the complemental sign bits SBDE(L-1) has the logic value 1. When one of the sign bits SBD(L-1) has the logic value 1, a corresponding one of the complemental sign bits SBDE(L-1) has the logic value 0, and so on.

In some embodiments, the memory array 320E is further configured to generate the sign bit signals SBS1(0)-SBS1 (L-1) and complemental sign bit signals SBS2(0)-SBS2(L-1). The sign bit signals SBS1(0)-SBS1(L-1) carry the sign bits SBD(0)-SBD(L-1), respectively. The complemental sign bit signals SBS2(0)-SBS2(L-1) carry the complemental sign bits SBDE(0)-SBDE(L-1), respectively. In some embodiments, the differential sign input/output circuit 340E is configured to amplify differential signal between the sign bit signal SBS1(0)-SBS1(L-1) and the complemental sign bit signal SBS2(0)-SBS2(L-1), to generate the sign bit signal SBS(0)-SBS(L-1). Accordingly, an acquisition time of the sign bit signal SBS(0)-SBS(L-1) decreases.

In the embodiment shown in FIG. 3E, the on-bit ratios $\eta$ of the memory array 310 is within a range of 50%±$\Delta\eta$(N, maxm).

Figure 3F:
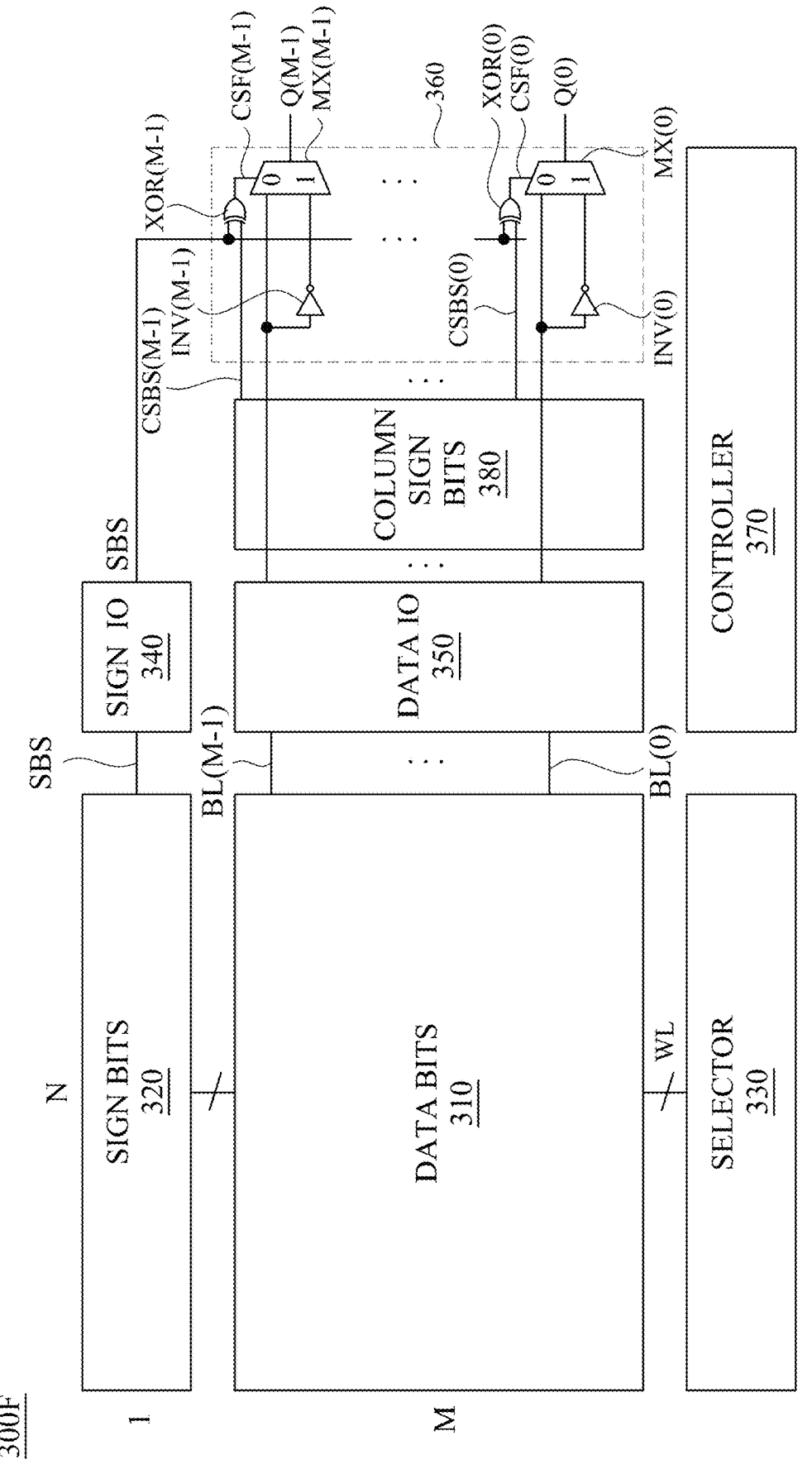
FIG. 3F is a schematic diagram of a memory device corresponding to the memory device shown in FIG. 3A, illustrated in accordance with some embodiments of the present disclosure.

FIG. 3F is a schematic diagram of a memory device 300F corresponding to the memory device 300A shown in FIG. 3A, illustrated in accordance with some embodiments of the present disclosure. Referring to FIGS. 3F and 3A, the memory device 300F is an alternative embodiment of the memory device 300A. FIG. 3F follows a similar labeling convention to that of FIG. 3A. For brevity, the discussion will focus more on differences between FIG. 3F and FIG. 3A than on similarities.

Compared to memory device 300A, the memory device 300F further includes a memory row 380 and logic elements XOR(0)-XOR(M-1). The logic elements XOR(0)-XOR(M-1) are included in the sign decoder 360 and are configured to generate control signals CSF(0)-CSF(M-1), respectively. The control terminals of the multiplexers are configured to receive control signals CSF(0)-CSF(M-1), respectively. In some embodiments, the logic elements XOR(0)-XOR(M-1) are implemented by XOR logic gates.

Referring to FIG. 3E and FIG. 2A, the memory row 380 is configured to store column sign bits CSB(0)-CSB(M-1), which correspond to the columns C2(0)-C2(M-1), respectively. In response to the logic value 1 of the column sign bits CSB(0)-CSB(M-1), data bits in corresponding ones of the columns C2(0)-C2(M-1) are reversed. In response to the logic value 0 of the column sign bits CSB(0)-CSB(M-1), data bits in corresponding ones of the columns C2(0)-C2 (M-1) are not reversed. In some embodiments, in response to the column sign bits CSB(0)-CSB(M-1), the sign bits SB1 are referred to as row sign bits.

In some embodiments, one the column sign bits CSB(0)-CSB(M-1) has the logic value 1 when a corresponding one of the on-bit numbers n(0)-n(M-1) is larger than N/2, and has the logic value 0 when the corresponding one of the on-bit numbers n(0)-n(M-1) is smaller than or equal to N/2. For example, when the on-bit number n(0) is larger than N/2, the column sign bit CSB(0) has the logic value 1. When the on-bit number n(0) is smaller than or equal to N/2, the column sign bit CSB(0) has the logic value 0.

In some embodiments, the memory row 380 is further configured to generate column sign bit signals CSBS(0)-CSBS(M-1). The column sign bit signals CSBS(0)-CSBS (M-1) carry the column sign bits CSB(0)-CSB(M-1), respectively. First input terminals of the logic elements XOR(0)-XOR(M-1) are configured to receive the column sign bit signals CSBS(0)-CSBS(M-1), respectively. Each of second input terminals of the logic elements XOR(0)-XOR(M-1) is configured to receive the sign bit signal SBS. The sign decoder 360 is configured to generate the data signals Q(0)-Q(M-1) according to the sign bit signal SBS, the bit line signals BL(0)-BL(M-1) and the column sign bit signals CSBS(0)-CSBS(M-1).

For example, when the row R2(0) in the memory array 310 is activated, the bit line signals BL(0) and BL(M-1) carry the data bits D2(0, 0) and D2(0, M-1), respectively. In a condition that the sign bit SB1(0), the column sign bits CSB(0) and CSB(M-1) have logic values 0, 1 and 0, respectively, the control signals CSF(0) and CSF(M-1) have logic values 1 and 0, respectively, such that the inverted version of the bit line signal BL(0) is outputted as the data signal Q(0), and the bit line signal BL(M-1) is outputted as the data signal Q(M-1).

In another condition that the sign bit SB1(0), the column sign bits CSB(0) and CSB(M-1) have logic values 1, 0 and 1, respectively, the control signals CSF(0) and CSF(M-1) have logic values 1 and 0, respectively, such that the inverted version of the bit line signal BL(0) is outputted as the data signal Q(0), and the bit line signal BL(M-1) is outputted as the data signal Q(M-1). It is noted that the data bit D2(0, M-1) is inverted twice according to the logic value 1 of the sign bit SB1(0) and the logic value 1 of the column sign bit CSB(M-1). Accordingly, the logic value of the data bit D2(0, M-1) is same as the data bit D1(0, M-1).

In the embodiment shown in FIG. 3F, the on-bit ratios $\eta$ of the memory array 310 is within a range of 50%-$\Delta\eta$(N, M) to 50%.

Figure 3G:
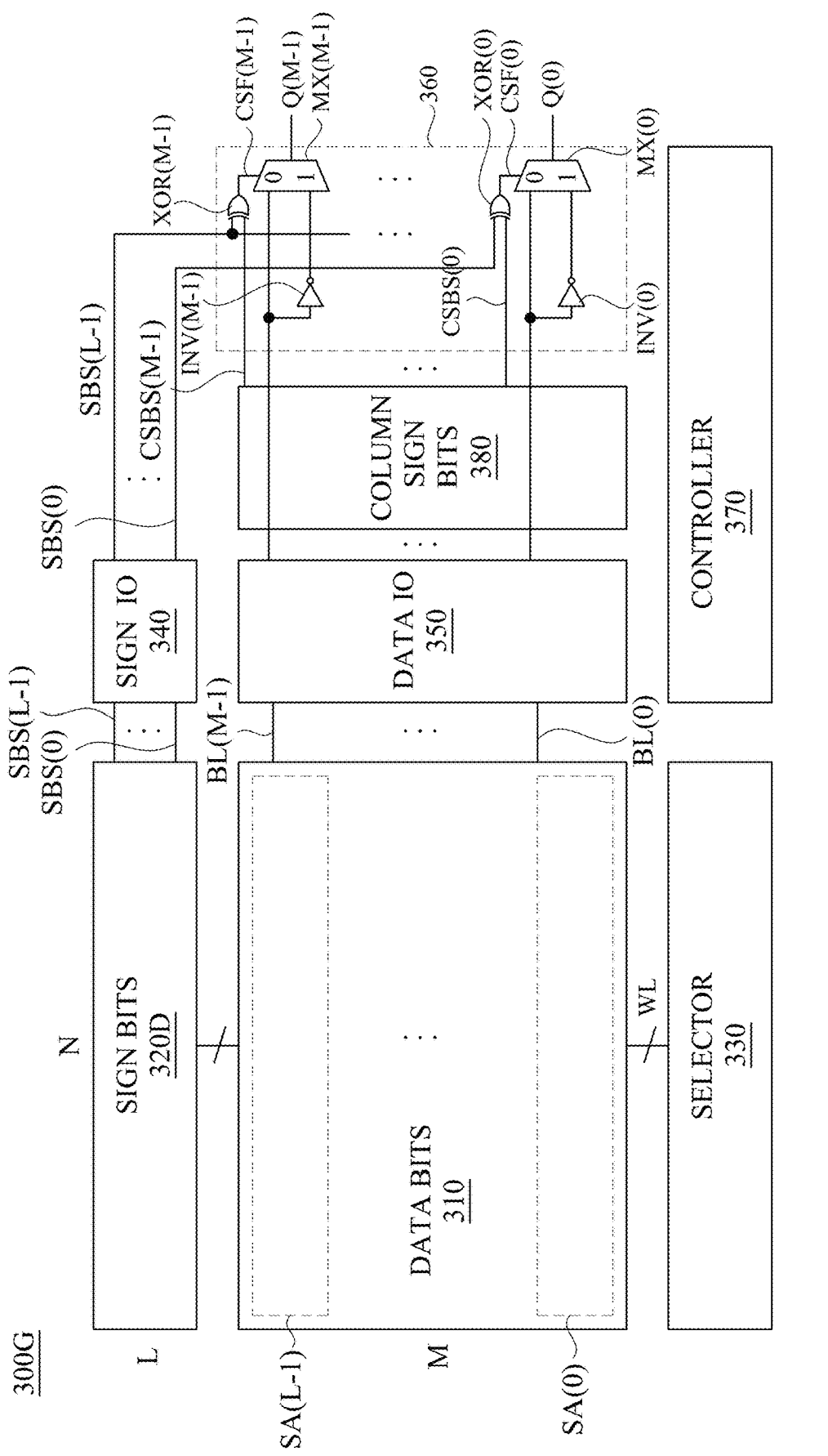
FIG. 3G is a schematic diagram of a memory device corresponding to the memory device shown in FIG. 3F, illustrated in accordance with some embodiments of the present disclosure.

FIG. 3G is a schematic diagram of a memory device 300G corresponding to the memory device 300F shown in FIG. 3F, illustrated in accordance with some embodiments of the present disclosure. Referring to FIGS. 3G and 3F, the memory device 300G is an alternative embodiment of the memory device 300F. FIG. 3G follows a similar labeling convention to that of FIG. 3F. For brevity, the discussion will focus more on differences between FIG. 3G and FIG. 3F than on similarities.

Compared to memory device 300F, the memory device 300G includes the memory array 320D instead of the memory column 320. The memory array 310 is separated into the sub-arrays SA(0)-SA(L-1). The features and operations of the memory array 320D and the sub-arrays SA(0)-

SA(L-1) are described above with the embodiments associated with the FIG. 3D. Therefore, some descriptions are not repeated for brevity.

In the embodiment shown in FIG. 3G, the first input terminals of the logic elements XOR(0)-XOR(M-1) are configured to receive the column sign bit signals CSBS(0)-CSBS(M-1), respectively. The logic elements XOR(0)-XOR(M-1) are separated into L logic element groups. The second terminals of the first logic element group are configured to receive the sign bit signals SBS(0). The second terminals of the second logic element group are configured to receive the sign bit signals SBS(1), and so on. The second terminals of the Lth logic element group are configured to receive the sign bit signals SBS(L-1). The logic elements XOR(0) and XOR(M-1) are included in the first logic element group and the Lth logic element group, respectively.

Accordingly, the sign decoder 360 is configured to generate the data signals Q(0)-Q(M-1) according to the sign bit signals SBS(0)-SBS(L-1), the bit line signals BL(0)-BL(M-1) and the column sign bit signals CSBS(0)-CSBS(M-1).

In the embodiment shown in FIG. 3F, the on-bit ratios $\eta$ of the memory array 310 is within a range of 50%-$\Delta\eta$(N, maxm) to 50%.

Figure 4A:
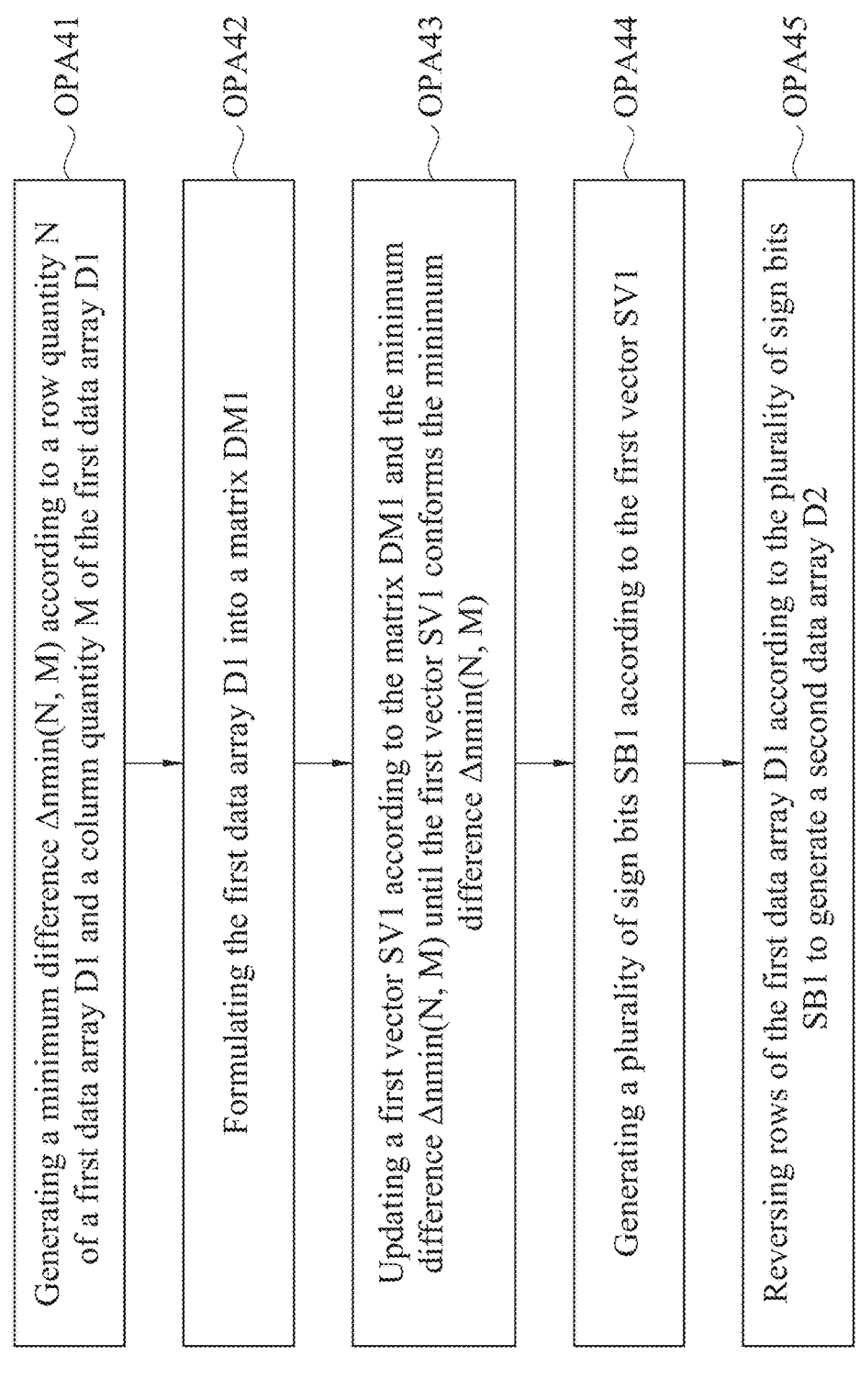
FIG. 4A is a flowchart diagram of a method of determining the sign bits shown in FIG. 1, illustrated in accordance with some embodiments of the present disclosure.

FIG. 4A is a flowchart diagram of a method 400A of determining the sign bits SB1 shown in FIG. 1, illustrated in accordance with some embodiments of the present disclosure. As illustratively shown in FIG. 4A, the method 400A includes operations OPA41-OPA46. Referring to FIG. 1 and FIG. 4A, the method 400A is performed by the processor 110 in some embodiments.

During the operation OPA41, the processor 110 generates a minimum difference $\Delta$nmin(N, M) according to a row quantity N of the data array D1 and a column quantity M of the data array D1. In some embodiments, in response to the row quantity N increased, the minimum difference $\Delta$nmin (N, M) is decreased, and in response to the column quantity M increased, the minimum difference $\Delta$nmin(N, M) is increased. The minimum difference $\Delta$nmin(N, M) is defined by equation (3) following. The equation (3) represents the mathematically possible minimum width of the on-bit ratio for any given data array D1. However, in various embodiments, larger values of $\Delta$nmin(N,M) can be used, even though the effectiveness of embodiments of the present disclosure is maximized with equation (3). It is noted that equation (3) as just an example for the minimum difference $\Delta$nmin(N, M). The notation $\lfloor \Phi \rfloor$ is a floor function of $\Phi$.

$$\Delta nmin(N, M) = N - 2\left\lfloor \Phi_N^{-1}\left(\frac{1}{2M}\right)\right\rfloor. \qquad \text{equation (3)}$$

During the operation OPA42, the processor 110 formulates the data array D1 into a matrix DM1. The matrix DM1 is defined by equation (4) following.

$$DM1 = \begin{bmatrix} d(0, 0) & \dots & d(N-1, 0) \\ \vdots & \ddots & \vdots \\ d(0, M-1) & \dots & d(N-1, M-1) \end{bmatrix} = \begin{bmatrix} dv(0) \\ \vdots \\ dv(M-1) \end{bmatrix}. \qquad \text{equation (4)}$$

During the formulation, the logic values 0 and 1 in the data array D1 is written into logic values 1 and -1, respectively. Specifically, for integers i between 0 and N-1 and integers j between 0 and M-1, the component d(i, j) of the matrix DM1 has the logic value 1 when the data bit D1(i, j) has the logic value 0, and has the logic value -1 when the data bit D1(i, j) has the logic value 1. It is noted that i is a row number of the component d(i, j), and j a column number of the component d(i, j).

After the operation OPA42, the processor 110 generates an initial vector SV1 corresponding to the sign bit SB1. The vector SV1 is defined by equation (5) following.

$$SV1 = \begin{bmatrix} SV1(0) \\ \vdots \\ SV1(N-1) \end{bmatrix}. \qquad \text{equation (5)}$$

Each of the components SV1(0)-SV1(N-1) has the logic value 1 or -1. In some embodiments, the components SV1(0)-SV1(N-1) of the initial vector SV1 are generated randomly. For example, before the operation OPA43, each of the components SV1(0)-SV1(N-1) can have the logic value 1.

During the operation OPA43, the processor 110 updates the vector SV1 until the vector SV1 conforms the minimum difference $\Delta$nmin(N, M). Further details the operation OPA43 are described below with the embodiments associated with FIG. 4B.

After the vector SV1 conforms the minimum difference $\Delta$nmin(N, M), the operation OPA44 is performed. During the operation OPA44, the processor 110 generates the sign bits SB1 according to the vector SV1. Specifically, for integers i between 0 and N-1, the sign bit SB1(i) has the logic value 0 when the component SV1(i) has the logic value 1, and has the logic value 1 when the component SV1(i) has the logic value -1.

During the operation OPA45, the processor 110 reverses rows of the data array D1 according to the sign bits SB1 to generate the data array D2. The Details of reversing rows of the data array D1 are described above with the embodiments associated with FIG. 2A. Therefore, some descriptions are not repeated for brevity.

Figure 4B:
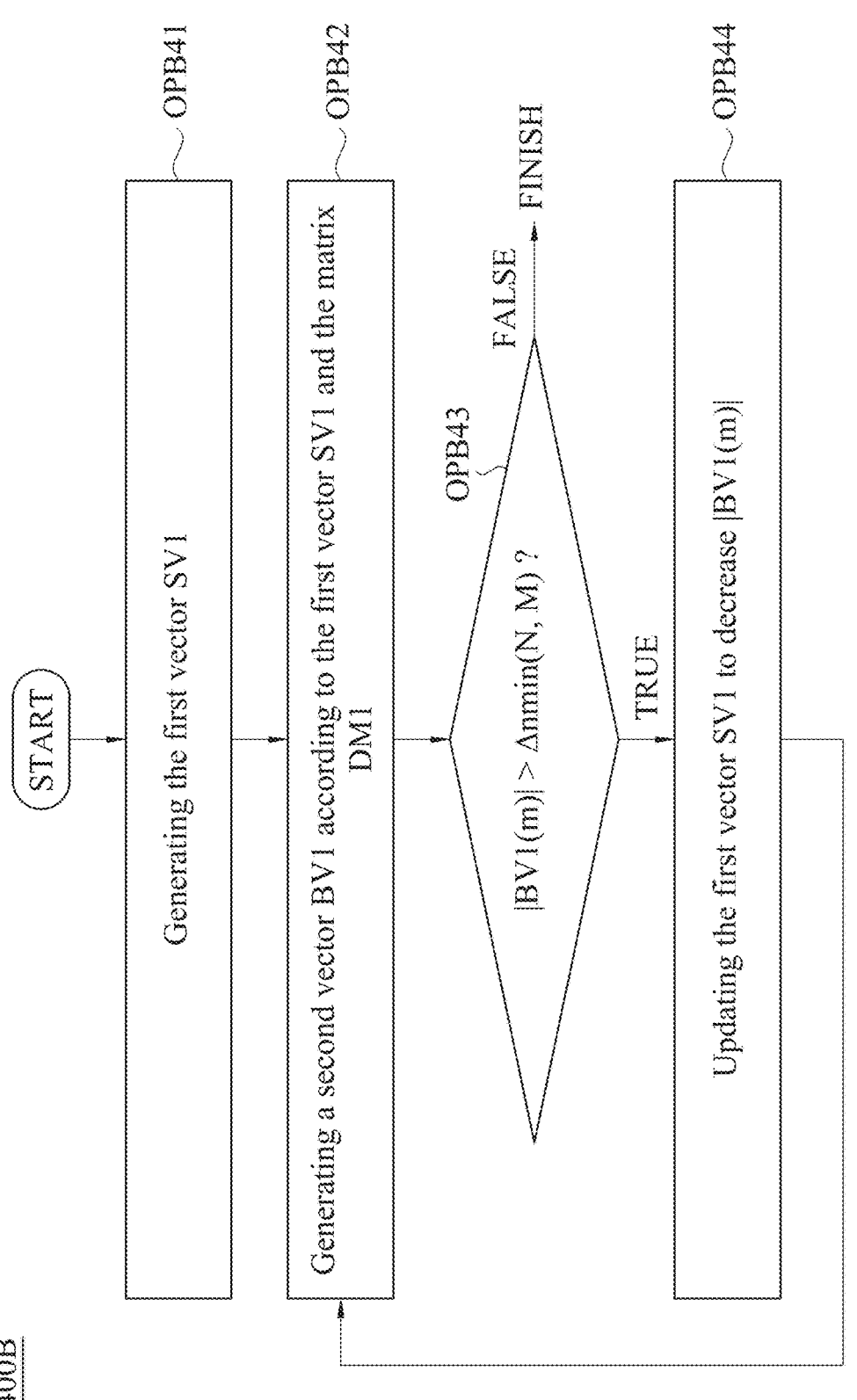
FIG. 4B is a flowchart diagram of a method of generating the vector conforming a minimum difference, illustrated in accordance with some embodiments of the present disclosure.

FIG. 4B is a flowchart diagram of a method 400B of generating the vector SV1 conforming the minimum difference $\Delta$nmin(N, M), illustrated in accordance with some embodiments of the present disclosure. As illustratively shown in FIG. 4B, the method 400B includes operations OPB41-OPB46. Referring to FIG. 1 and FIG. 4B, the method 400B is performed by the processor 110 in some embodiments. Referring to FIG. 4A and FIG. 4B, the method 400B is included in the operation OPA43 in some embodiments.

During the operation OPB41, the processor 110 generates the initial vector SV1.

Referring to FIG. 4A and FIG. 4B, the operation OPB41 is performed after the operation OPA42 in some embodiments.

During the operation OPB42, the processor 110 generates a vector BV1. The vector BV1 is defined by equation (6) following.

$$BV1 = DM1 * SV1 = \begin{bmatrix} BV1(0) \\ \vdots \\ BV1(M-1) \end{bmatrix}. \qquad \text{equation (6)}$$

During the operation OPB42, the processor 110 further determines a number m, such that an absolute value of a component BV1(m) is the largest absolute value among the absolute values of the components BV(0)-BV(M-1). Alternatively stated, the processor 110 searches the number m such that argmax(i)|BV(i)|=m, in which the absolute value |BV(i)| is the absolute value of the component BV1(i) for an integer i. it is noted that i is a column number of the component BV1(i).

During the operation OPB43, the processor 110 compares the absolute value |BV1(m)| with the minimum difference $\Delta$nmin(N, M). In response to the absolute value |BV1(m)| larger than the minimum difference $\Delta$nmin(N, M), the operation OPB44 is performed after the operation OPB43. In response to the absolute value |BV1(m)| smaller than or equal to the minimum difference $\Delta$nmin(N, M), the method 400B is finished after the operation OPB43, and the processor 110 determines that the current vector SV1 conforms the minimum difference $\Delta$nmin(N, M).

During the operation OPB44, the processor 110 updates the initial vector SV1 to decrease the absolute value |BV1(m)|. Specifically, the processor 110 flips at least one of the components SV1(0)-SV1(N-1) from the logic value 1 to the logic value –1, or from the logic value –1 to the logic value 1. Further details of the operation OPB44 are described below with the embodiments associated with FIG. 4C.

After the operation OPB44, the operation OPB42 is performed again with the updated vector SV1. Then, the operation OPB42 is performed again to determine whether the updated vector SV1 conforms the minimum difference $\Delta$nmin(N, M). Alternatively stated, a loop of the operation OPB42-OPB44 is performed continuously until the vector SV1 conforms the minimum difference $\Delta$nmin(N, M).

Figure 4C:
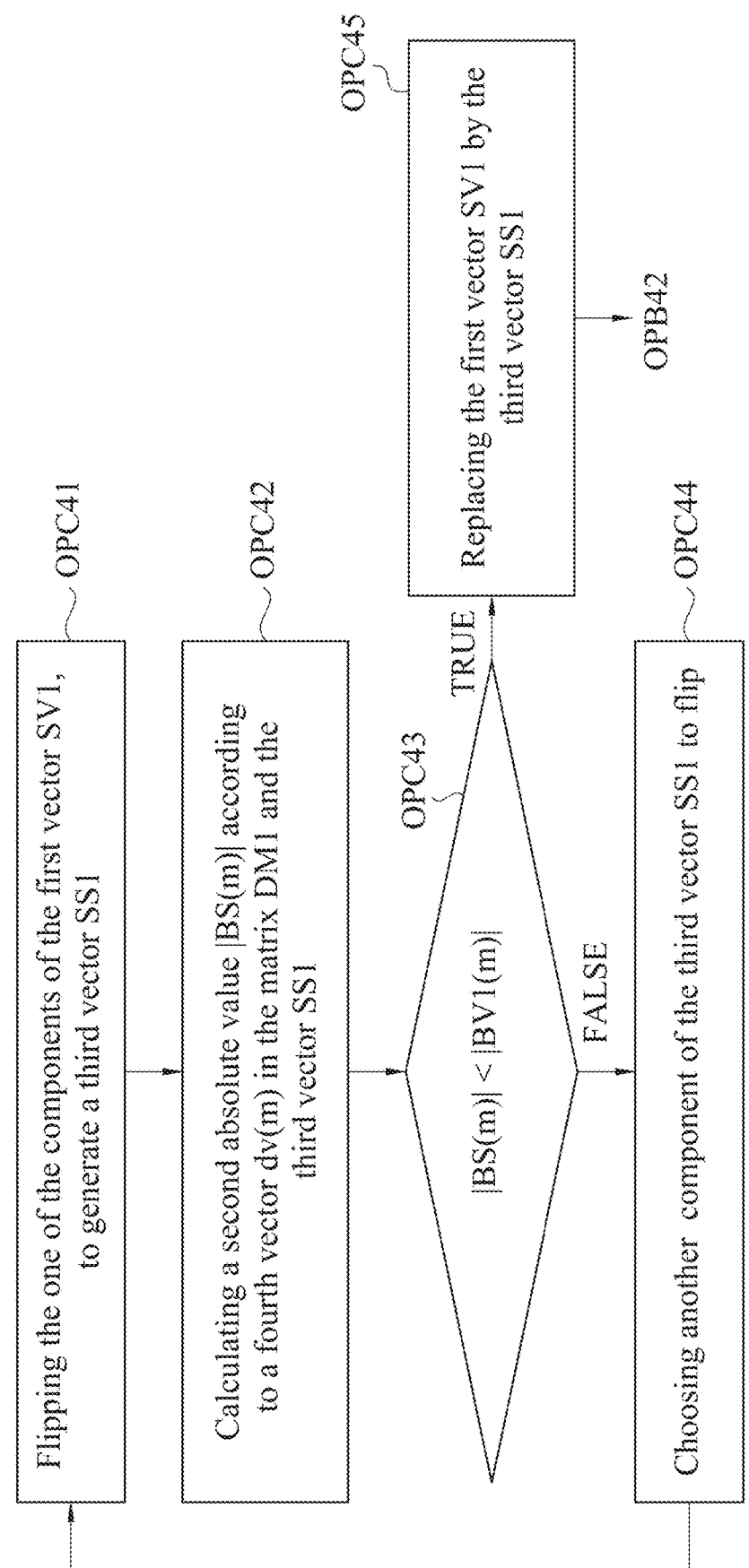
FIG. 4C is a flowchart diagram of a method of updating a vector to decrease an absolute value, illustrated in accordance with some embodiments of the present disclosure.

FIG. 4C is a flowchart diagram of a method 400C of updating the vector SV1 to decrease the absolute value |BV1(m)|, illustrated in accordance with some embodiments of the present disclosure. As illustratively shown in FIG. 4C, the method 400C includes operations OPC41-OPC46. Referring to FIG. 1 and FIG. 4C, the method 400C is performed by the processor 110 in some embodiments. Referring to FIG. 4C and FIG. 4B, the method 400C is included in the operation OPB44 in some embodiments.

During the operation OPC41, the processor 110 flips one of the components SV1(0)-SV1(N-1) to generate a vector SS1. One of the components of the vector SS1 is different from the vector SV1, and other components of the vector SS1 are the same as the vector SV1.

For example, the vector SS1 includes components SS1 (0)-SS1(N-1). When the processor 110 flips the component SV1(j) to generate the vector SS1. A logic value of component SS1(j) is equal to the logic value of the component SV1(j) multiplied by minus one. For integer i not equal to j, a logic value of component SS1(i) is equal to the logic value of the component SV1(i).

During the operation OPC42, the processor 110 calculates an absolute value |BS(m)|. The absolute value |BS(m)| is the absolute value of a component BS(m). The component BS(m) is an inner product of the vectors dv(m) and SS1. Alternatively stated, the component BS(m) is defined by BS(m)=dv(m)·SS1.

During the operation OPC43, the processor 110 compares the absolute values |BS(m)| and |BV1(m)|. In response to the absolute value |BS(m)| smaller than the absolute value |BV1(m)|, the operation OPC45 is performed after the operation OPC43. In response to the absolute value |BS(m)| larger than or equal to the absolute value |BV1(m)|, the operation OPC44 is performed after the operation OPC43.

During the operation OPC45, the processor 110 replaces the vector SV1 by the vector SS1. Alternatively stated, the components of the updated vector SV1 are same as the components of the vector SS1. After the operation OPC45, the processor 110 performs the operation OPB42 with the updated vector SV1.

During the operation OPC44, the processor 110 chooses an integer k different from the integer j for updating the vector SS1. After the operation OPC44, the operation OPC41 is performed again with the integer j being replaced by the integer k. Alternatively stated, the processor 110 flips the component SV1(k) to generate the updated vector SS1.

Accordingly, the loop of operation OPC41-OPC44 is performed continuously to update the vector SS1 until the absolute value |BS(m)| smaller than the absolute value |BV1(m)|. Then, the processor 110 replaces the vector SV1 by the updated vector SS1 to update the vector SV1, such that the absolute value |BV1(m)| is decreased for the updated vector SV1.

Figure 5:
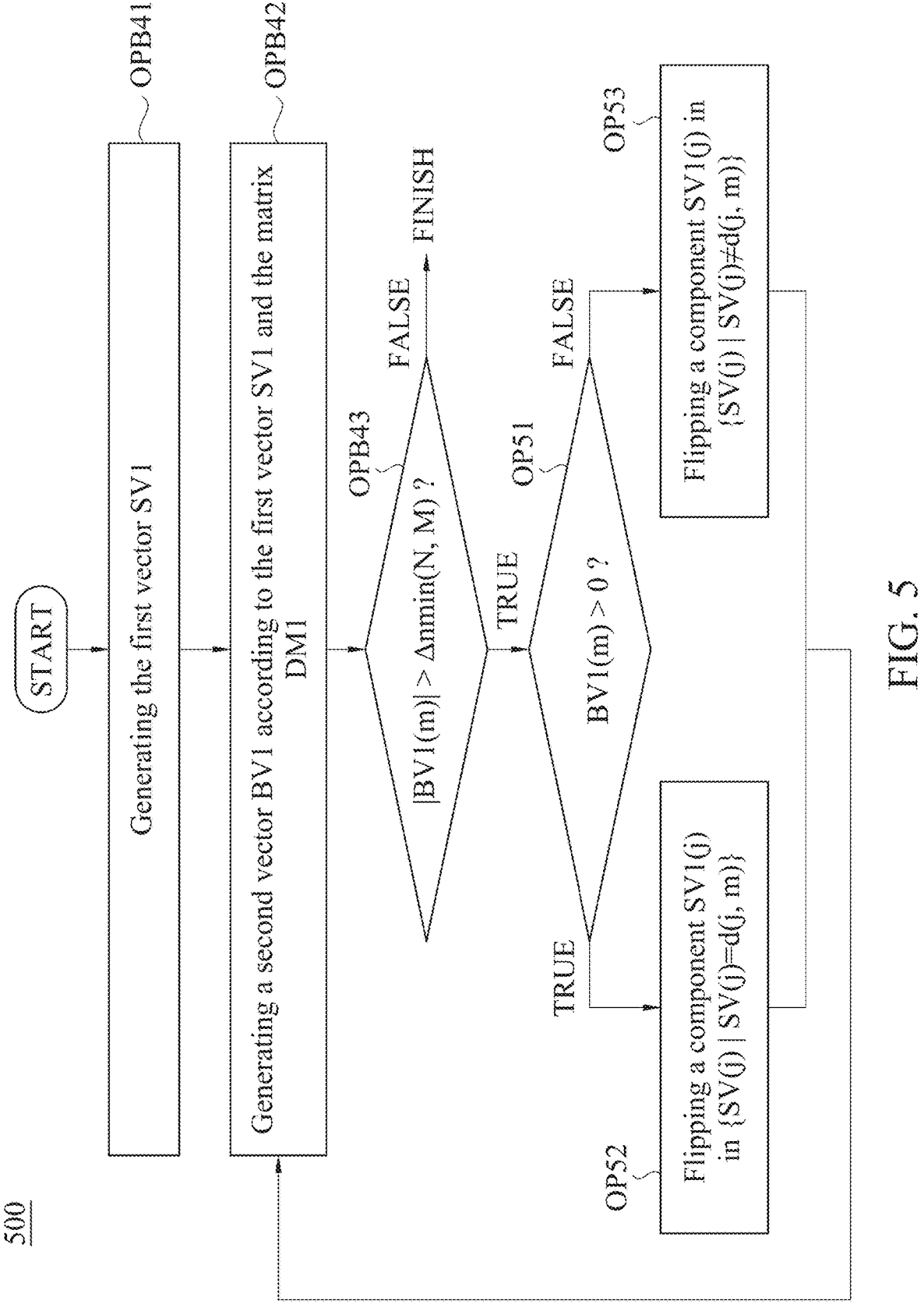
FIG. 5 is a flowchart diagram of a method of generating the vector conforming the minimum difference, illustrated in accordance with some embodiments of the present disclosure.

FIG. 5 is a flowchart diagram of a method 500 of generating the vector SV1 conforming the minimum difference $\Delta$nmin(N, M), illustrated in accordance with some embodiments of the present disclosure. As illustratively shown in FIG. 5, the method 500 includes the operations OPB41-OPB43 and operations OP51-OP53. Referring to FIG. 1 and FIG. 5, the method 500 is performed by the processor 110 in some embodiments. Referring to FIG. 5 and FIG. 4A, the method 500 is included in the operation OPA43 in some embodiments.

Referring to FIG. 5 and FIG. 4B, the method 500 is an alternative embodiment of the method 4B. Therefore, some descriptions are not repeated for brevity. For example, the descriptions of the operations OPB41-OPB43 are described above with the embodiments associated with the FIG. 4B.

In the embodiment shown in FIG. 5, during the operation OPB43, in response to the absolute value |BV1(m)| larger than the minimum difference $\Delta$nmin(N, M), the operation OP51 is performed after the operation OPB43.

During the operation OP51, the processor 110 compares the component BV1(m) and zero. In response to the component BV1(m) larger than zero, the operation OP52 is performed after the operation OP51. In response to the component BV1(m) smaller than or equal to zero, the operation OP53 is performed after the operation OP51.

During the operation OP52, the processor flips a component SV1(j) of the vector SV1 for an integer j satisfying the component SV1(j) being equal to the component d(j, m), to update the vector SV1. After the operation OP52, the processor performs the operation OPB42 again with the updated vector SV1. It is noted that j is the column number of the component SV1(j).

During the operation OP53, the processor flips a component SV1(j) of the vector SV1 for an integer j satisfying the component SV1(j) being not equal to the component d(j, m), to update the vector SV1. After the operation OP53, the processor performs the operation OPB42 again with the updated vector SV1.

Referring to FIG. 5 and FIG. 4B, the operations OP52 and OP53 are alternative embodiments of the operation OPB44, which updates the vector SV1. Alternatively stated, during the operations OP52 and OP53, processor updates different components of the vector SV1 according to whether the component BV1(m) is larger than zero.

Figure 6:
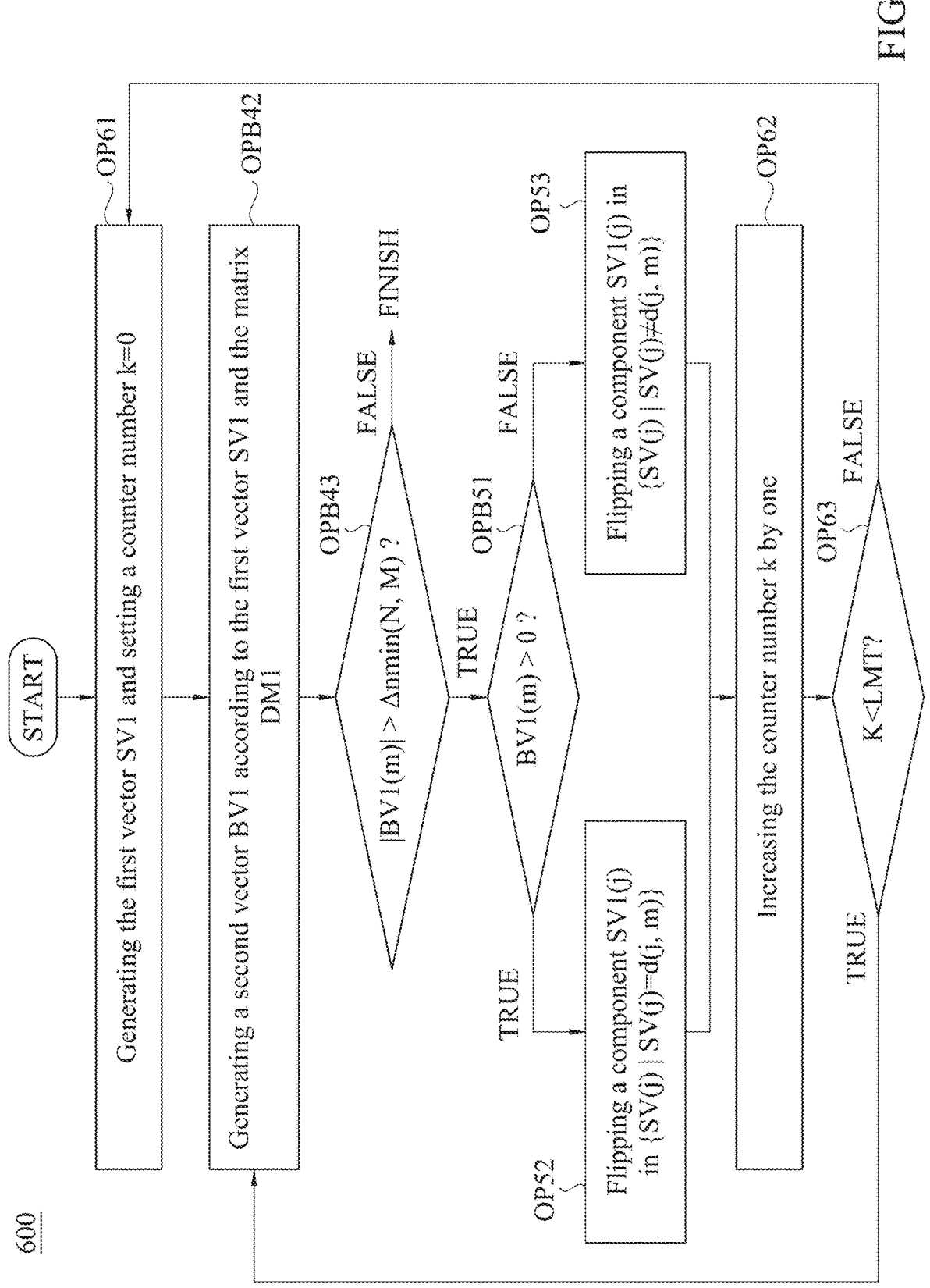
FIG. 6 is a flowchart diagram of a method of generating the vector conforming the minimum difference, illustrated in accordance with some embodiments of the present disclosure.

FIG. 6 is a flowchart diagram of a method 600 of generating the vector SV1 conforming the minimum difference $\Delta$nmin(N, M), illustrated in accordance with some embodiments of the present disclosure. As illustratively shown in FIG. 6, the method 600 includes the operations OPB42-OPB43, OP51-OP53 and operations OP61-OP63. Referring to FIG. 1 and FIG. 6, the method 600 is performed by the processor 110 in some embodiments. Referring to FIG. 6 and FIG. 4A, the method 600 is included in the operation OPA43 in some embodiments.

Referring to FIG. 6 and FIG. 5, the method 600 is an alternative embodiment of the method 500. Therefore, some descriptions are not repeated for brevity. For example, the descriptions of the operations OP51-OP53 are described above with the embodiments associated with the FIG. 5.

During the operation OP61, the processor 110 generates the initial vector SV1 and sets a counter number k equal to zero. After the operation OP61, the operation OPB42, OPB43 and OP51 are performed in order. After the operation OP51, one of the operations OP52 and OP53 are performed. After the one of the operations OP52 and OP53, the operation OP62 is performed.

During the operation OP62, the processor 110 increases the counter number k by one. For example, in the first loop of operations OPB42 to OP62, the processor 110 changes a value of the counter number k from zero to one.

During the operation OP63, the processor 110 compares the counter number k with a limit number LMT. In response to the counter number k smaller than the limit number LMT, the operation OPB42 is performed after the operation OP63. In response to the counter number k larger than or equal to the limit number LMT, the operation OP61 is performed after the operation OP63 to generate the initial vector SV1 again and set the counter number k to zero again. It is noted that counter number k is used to prevent the vector SV1 being trapped at local minimum of |BV1(m)|.

In some embodiment, the limit number LMT is larger when a size of the data array D1 is larger. For example, when the row quantity N is increased, the limit number LMT is increased, and when the column quantity M is increased, the limit number LMT is increased. In contrast, when the row quantity N is decreased, the limit number LMT is decreased, and when the column quantity M is decreased, the limit number LMT is decreased.

Figure 7:
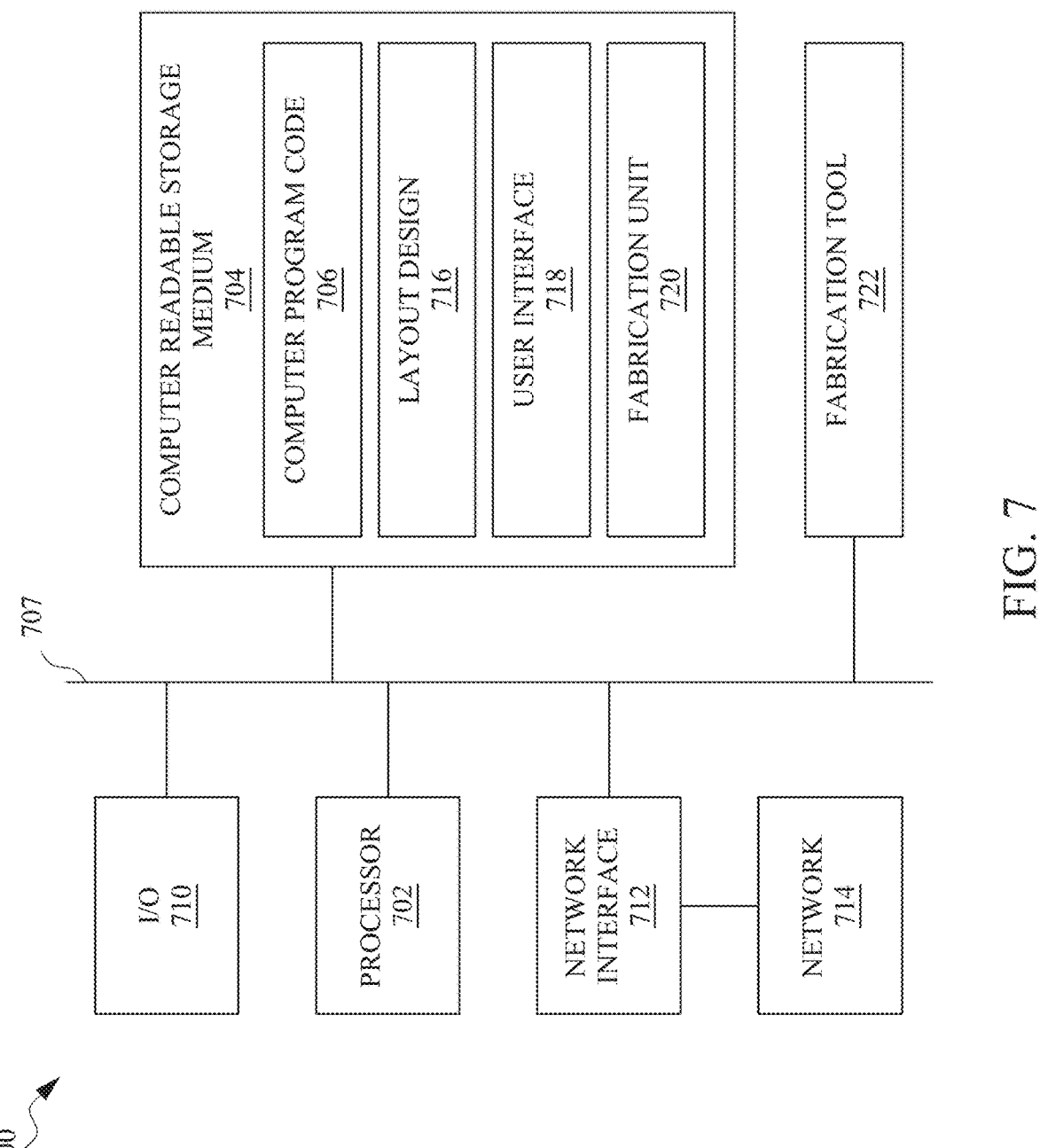
FIG. 7 is a schematic view of a system for designing and manufacturing a memory device, in accordance with some embodiments of the present disclosure.

FIG. 7 is a schematic view of a system 700 for designing and manufacturing the memory device 101, in accordance with some embodiments of the present disclosure. The system 700 generates or places one or more IC layout designs corresponding to the memory device 101, as described herein. In some embodiments, the system 700 manufactures one or more semiconductor devices based on the one or more IC layout designs, as described herein. The system 700 includes a hardware processor 702 and a non-transitory, computer readable storage medium 704 encoded with, e.g., storing, the computer program code 706, e.g., a set of executable instructions. The computer readable storage medium 704 is configured for interfacing with manufacturing machines for producing the semiconductor device. The processor 702 is electrically coupled to the computer readable storage medium 704 by a bus 707. The processor 702 is also electrically coupled to an I/O interface 710 by the bus 707. A network interface 712 is also electrically connected to the processor 702 by the bus 707. Network interface 712 is connected to a network 714, so that the processor 702 and the computer readable storage medium 704 are capable of connecting to external elements via network 714. The processor 702 is configured to execute the computer program code 706 encoded in the computer readable storage medium 704 in order to cause the system 700 designing and manufacturing the memory device 101.

In some embodiments, the processor 702 is a central processing unit (CPU), a multi-processor, a distributed processing system, an application specific integrated circuit (ASIC), and/or a suitable processing unit. Referring to FIG.

1 and FIG. 7, the processor 110 is implemented by the processor 702 in some embodiments.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 also stores information needed for designing and manufacturing the memory device 101, such as layout design 716, user interface 718, fabrication unit 720, and/or a set of executable instructions to designing and manufacturing the memory device 101.

In some embodiments, the storage medium 704 stores instructions (e.g., the computer program code 706) for interfacing with manufacturing machines. The instructions (e.g., the computer program code 706) enable the processor 702 to generate manufacturing instructions readable by the manufacturing machines to effectively implement the memory device 101. Referring to FIG. 1 and FIG. 7, the manufacturing device 120 is implemented by the manufacturing machines in some embodiments.

The system 700 includes the I/O interface 710. The I/O interface 710 is coupled to external circuitry. In some embodiments, the I/O interface 710 includes a keyboard, keypad, mouse, trackball, trackpad, and/or cursor direction keys for communicating information and commands to the processor 702.

The system 700 also includes the network interface 712 coupled to the processor 702. The network interface 712 allows the system 700 to communicate with the network 714, to which one or more other computer systems are connected. The network interface 712 includes wireless network interfaces such as BLUETOOTH, WIFI, WIMAX, GPRS, or WCDMA; or wired network interface such as ETHERNET, USB, or IEEE-13154. In some embodiments, the designing and manufacturing of the memory device 101 is implemented in two or more systems 700, and information such as layout design, user interface and fabrication unit are exchanged between different systems 700 by the network 714.

The system 700 is configured to receive information related to a layout design through the I/O interface 710 or network interface 712. The information is transferred to the processor 702 by the bus 707 to determine a layout design for producing an IC. The layout design is then stored in the computer readable medium 704 as the layout design 716. The system 700 is configured to receive information related to a user interface through the I/O interface 710 or network interface 712. The information is stored in the computer readable medium 704 as the user interface 718. The system 700 is configured to receive information related to a fabrication unit through the I/O interface 710 or network interface 712. The information is stored in the computer readable medium 704 as the fabrication unit 720. In some embodiments, the fabrication unit 720 includes fabrication information utilized by the system 700.

In some embodiments, the designing and manufacturing of the memory device 101 is implemented as a standalone software application for execution by a processor.

In some embodiments, the designing and manufacturing of the memory device 101 is implemented as a software application that is a part of an additional software application. In some embodiments, the designing and manufacturing of the memory device 101 is implemented as a plug-in to a software application. In some embodiments, the designing and manufacturing of the memory device 101 is implemented as a software application that is a portion of an EDA tool. In some embodiments, the designing and manufacturing of the memory device 101 is implemented as a software application that is used by an EDA tool. In some embodiments, the EDA tool is used to generate a layout design of the integrated circuit device. In some embodiments, the layout design is stored on a non-transitory computer readable medium. In some embodiments, the layout design is generated using a tool such as VIRTUOSO® available from CADENCE DESIGN SYSTEMS, Inc., or another suitable layout generating tool. In some embodiments, the layout design is generated based on a netlist which is created based on the schematic design. In some embodiments, the memory device 101 is implemented by a manufacturing device to manufacture an integrated circuit using a set of masks manufactured based on one or more layout designs generated by the system 700. In some embodiments, the system 700 includes a manufacturing device (e.g., fabrication tool 722) to manufacture an integrated circuit using a set of masks manufactured based on one or more layout designs of the present disclosure.

Figure 8:
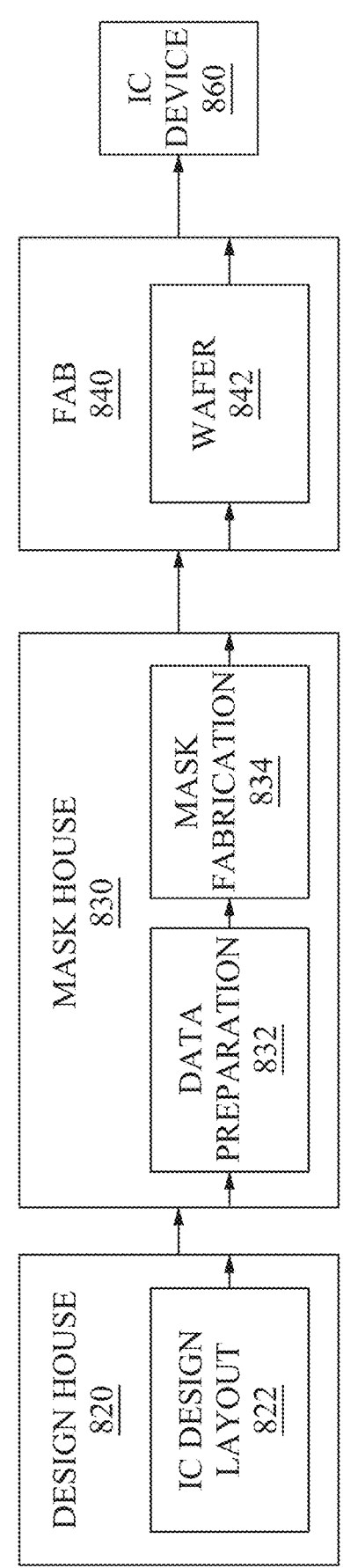
FIG. 8 is a block diagram of an integrated circuit (IC)/semiconductor device manufacturing system, and an IC manufacturing flow associated therewith, in accordance with some embodiments of the present disclosure.

FIG. 8 is a block diagram of an integrated circuit (IC)/ semiconductor device manufacturing system 800, and an IC manufacturing flow associated therewith, in accordance with some embodiments of the present disclosure. Referring to FIG. 1 and FIG. 8, the manufacturing device 120 is implemented by part or all of the manufacturing system 800.

In FIG. 8, the IC manufacturing system 800 includes entities, such as a design house 820, a mask house 830, and an IC manufacturer/fabricator ("fab") 840, that interact with one another in the design, development, and manufacturing cycles and/or services related to manufacturing an IC device (semiconductor device) 860 including the memory device 101. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 840 is owned by a single company. In some embodiments, two or more of design house 820, mask house 830, and IC fab 840 coexist in a common facility and use common resources.

The design house (or design team) 820 generates an IC design layout 822. The IC design layout 822 includes various geometrical patterns designed for the IC device 860. The geometrical patterns correspond to patterns of metal, oxide, or semiconductor layers that make up the various components of the IC device 860 to be fabricated. The various layers combine to form various IC features. For example, a portion of the IC design layout 822 includes various IC features, such as an active region, gate structures, source/drain structures, interconnect structures, and openings for bonding pads, to be formed in a semiconductor substrate (such as a silicon wafer) and various material layers disposed on the semiconductor substrate. The design house 820 implements a proper design procedure to form the IC design layout 822. The design procedure includes one or more of logic design, physical design or place and route. The IC design layout 822 is presented in one or more data files having information of the geometrical patterns. For example, the IC design layout 822 can be expressed in a GDSII file format or DFII file format.

The mask house 830 includes mask data preparation 832 and mask fabrication 834. The mask house 830 uses the IC design layout 822 to manufacture one or more masks to be used for fabricating the various layers of the IC device 860 according to the IC design layout 822. The mask house 830 performs the mask data preparation 832, where the IC design layout 822 is translated into a representative data file ("RDF").

The mask data preparation 832 provides the RDF to the mask fabrication 834. The mask fabrication 834 includes a mask writer. A mask writer converts the RDF to an image on a substrate, such as a mask (reticle) or a semiconductor wafer, or a metal layer which is formed and thereafter selectively etched to form a redistribution layer at a back end of line process of the fab. The design layout is manipulated by the mask data preparation 832 to comply with particular characteristics of the mask writer and/or requirements of the IC fab 840. In FIG. 8, the mask data preparation 832 and mask fabrication 834 are illustrated as separate elements. In some embodiments, the mask data preparation 832 and mask fabrication 834 can be collectively referred to as mask data preparation.

In some embodiments, the mask data preparation 832 includes optical proximity correction (OPC) which uses lithography enhancement techniques to compensate for image errors, such as those that can arise from diffraction, interference, other process effects and the like. OPC adjusts the IC design layout 822. In some embodiments, the mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 832 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during the mask fabrication 834, which may undo part of the modifications performed by OPC in order to meet mask creation rules.

In some embodiments, the mask data preparation 832 includes lithography process checking (LPC) that simulates processing that will be implemented by the IC fab 840 to fabricate the IC device 860. LPC simulates this processing based on the IC design layout 822 to create a simulated manufactured device, such as the IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC can be repeated to further refine the IC design layout 822.

It should be understood that the above description of the mask data preparation 832 has been simplified for the purposes of clarity. In some embodiments, the mask data preparation 832 includes additional features such as a logic operation (LOP) to modify the IC design layout according to manufacturing rules. Additionally, the processes applied to the IC design layout 822 during the mask data preparation 832 may be executed in a variety of different orders.

After the mask data preparation 832 and during mask fabrication 834, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by the mask fabrication 834 is used in a variety of processes. For example, such a mask(s) is used in an ion implantation process to form various doped regions in the semiconductor wafer, in an etching process to form various etching regions in the semiconductor wafer, and/or in other suitable processes.

The IC fab 840 is an IC fabrication entity that includes one or more manufacturing facilities for the fabrication of a variety of different IC products. In some embodiments, the IC fab 840 is a semiconductor foundry. For example, there may be a first manufacturing facility for the front end fabrication of a plurality of IC products (e.g., source/drain structures, gate structures), while a second manufacturing facility may provide the middle end fabrication for the interconnection of the IC products (e.g., MDs, VDs, VGs) and a third manufacturing facility may provide the back end fabrication for the interconnection and packaging of the IC products (e.g., M0 tracks, M1 tracks, BM0 tracks, BM1 tracks), and a fourth manufacturing facility may provide other services for the foundry entity.

The IC fab 840 uses the mask (or masks) fabricated by the mask house 830 to fabricate the IC device 860. Thus, the IC fab 840 at least indirectly uses the IC design layout 822 to fabricate the IC device 860. In some embodiments, a semiconductor wafer is fabricated by the IC fab 840 using the mask (or masks) to form the IC device 860. The semiconductor wafer 842 includes a silicon substrate or other proper substrate having material layers formed thereon. Semiconductor wafer further includes one or more of various doped regions, dielectric features, multilevel interconnects, and the like (formed at subsequent manufacturing steps).

Also disclosed is a memory device. The memory device includes a first memory column, a memory array and a sign decoder. The first memory column is configured to store a plurality of first sign bits. The memory array is configured to store a first data array and generate a plurality of bit line signals. The sign decoder is configured to output a plurality of data signals according to the plurality of first sign bits and the plurality of bit line signals. The plurality of data signals corresponds to a second data array, and the first data array is generated by reversing rows of the second data array according to the plurality of first sign bits.

Also disclosed is a method. The method includes: generating a minimum difference according to a row quantity of a first data array and a column quantity of the first data array; formulating the first data array into a matrix; updating a first vector according to the matrix and the minimum difference until the first vector conforms the minimum difference; generating a plurality of sign bits according to the first vector; reversing rows of the first data array according to the plurality of sign bits to generate a second data array; and storing the second data array and the plurality of sign bits into a memory device.

Also disclosed is a system. The system includes a processor and a manufacturing device. The processor is configured to generate a plurality of sign bits according to a column quantity of a first data array and a row quantity of the first data array, and reverse rows of the first data array to generate a second data array. The manufacturing device is configured to manufacture a memory device storing the first data array and the plurality of sign bits. The memory device is configured to output the first data array.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   generating a minimum difference according to a row quantity of a first data array and a column quantity of the first data array;
   formulating the first data array into a matrix;
   updating a first vector according to the matrix and the generated minimum difference until the first vector conforms to the generated minimum difference;
   generating a plurality of sign bits according to the first vector;
   reversing rows of the first data array according to the plurality of sign bits generated according to the first vector to generate a second data array; and
   storing the second data array and the plurality of sign bits generated according to the first vector into a memory device.

2. The method of claim 1, further comprising:
   generating the first vector;
   generating a second vector according to the first vector and the matrix;
   comparing a first absolute value of a first component of the second vector with the generated minimum difference; and in response to the first absolute value smaller than or equal to the generated minimum difference, determining the first vector for generating the plurality of sign bits.

3. The method of claim 2, wherein the first absolute value is the largest one among the absolute values of the components of the second vector.

4. The method of claim 2, further comprising:

in response to the first absolute value larger than the generated minimum difference, flipping one of components of the first vector, to decrease the first absolute value.

5. The method of claim 4, further comprising:

flipping the one of the components of the first vector, to generate a third vector;

calculating a second absolute value according to a fourth vector in the matrix and the third vector;

comparing the second absolute value and the first absolute value; and in response to the second absolute value smaller than the first absolute value, replacing the first vector by the third vector.

6. The method of claim 5, further comprising:

in response to the second absolute value larger than or equal to the first absolute value, flipping another one of the components of the first vector, to update the third vector.

7. The method of claim 5, further comprising:

comparing the first component with zero; and in response to the first component larger than zero, flipping a second component of the first vector, wherein the second component is equal to a third component of the matrix, and a row number of the third component is equal to a column number of the second component, and a column number of the third component is equal to a column number of the first component.

8. The method of claim 7, further comprising:

in response to the first component smaller than or equal to zero, flipping a fourth component of the first vector, wherein the fourth component is not equal to a fifth component of the matrix, and a row number of the fifth component is equal to a column number of the fourth component, and a column number of the fifth component is equal to the column number of the first component.

9. The method of claim 7, further comprising:

when the first vector is generated, setting a counter number to an initial value;

after the first vector is updated, increasing the counter number;

comparing the counter number with a limit number;

in response to the counter number smaller than the limit number, generating the second vector with the updated first vector; and in response to the counter number larger than or equal to the limit number, setting the counter number to the initial value and generating the first vector again.

10. The method of claim 9, wherein when a size of the first data array is increased, the limit number is increased.

11. A method, comprising:

generating a minimum difference according to a row quantity of a first data array and a column quantity of the first data array;

formulating the first data array into a matrix;

updating a first vector according to the matrix and the generated minimum difference until the first vector conforms to the generated minimum difference;

generating a plurality of sign bits according to the first vector;

reversing rows of the first data array according to the plurality of sign bits generated according to the first vector to generate a second data array;

storing the second data array and the plurality of sign bits generated according to the first vector into a memory device; and outputting a plurality of data signals corresponding to the first data array according to the plurality of sign bits generated according to the first vector.

12. The method of claim 11, further comprising:

generating a plurality of bit line signals by a memory array;

receiving a first bit line signal of the plurality of bit line signals by an inverter; and outputting one of the plurality of data signals according to the plurality of sign bits by a multiplexer, wherein a first input terminal of the multiplexer is configured to receive the first bit line signal, and a second input terminal of the multiplexer is coupled to an output terminal of the inverter.

13. The method of claim 11, further comprising:

generating the first vector;

generating a second vector according to the first vector and the matrix;

comparing a first absolute value of a first component of the second vector with the generated minimum difference; and in response to the first absolute value smaller than or equal to the generated minimum difference, determining the first vector for generating the plurality of sign bits.

14. The method of claim 13, wherein the first absolute value is the largest one among the absolute values of the components of the second vector.

15. The method of claim 13, further comprising:

in response to the first absolute value larger than the generated minimum difference, flipping one of components of the first vector, to decrease the first absolute value.

16. The method of claim 15, further comprising:

flipping the one of the components of the first vector, to generate a third vector;

calculating a second absolute value according to a fourth vector in the matrix and the third vector;

comparing the second absolute value and the first absolute value; and in response to the second absolute value smaller than the first absolute value, replacing the first vector by the third vector.

17. A method, comprising:

generating a minimum difference according to a row quantity of a first data array and a column quantity of the first data array;

formulating the first data array into a matrix;

updating a first vector according to the matrix and the generated minimum difference until the first vector conforms to the generated minimum difference;

generating a plurality of sign bits according to the first vector;

reversing rows of the first data array according to the plurality of sign bits generated according to the first vector to generate a second data array;

manufacturing a memory device storing the second data array and the plurality of sign bits generated according to the first vector; and outputting the first data array by the memory device according to the second data array and the plurality of sign bits generated according to the first vector.

18. The method of claim 17, further comprising:

generating the first vector;

generating a second vector according to the first vector and the matrix;

comparing a first absolute value of a first component of the second vector with the generated minimum difference;

in response to the first absolute value smaller than or equal to the generated minimum difference, determining the first vector for generating the plurality of sign bits; and in response to the first absolute value larger than the generated minimum difference, flipping one of components of the first vector, to decrease the first absolute value.

19. The method of claim 18, further comprising:

flipping the one of the components of the first vector, to generate a third vector;

calculating a second absolute value according to a fourth vector in the matrix and the third vector;

comparing the second absolute value and the first absolute value; and in response to the second absolute value smaller than the first absolute value, replacing the first vector by the third vector.

20. The method of claim 19, further comprising:

in response to the second absolute value larger than or equal to the first absolute value, flipping another one of the components of the first vector, to update the third vector.

* * * * *